(12) United States Patent
Zapponi et al.

(10) Patent No.: US 10,904,104 B2
(45) Date of Patent: Jan. 26, 2021

(54) INTERACTIVE INTERFACE FOR NETWORK EXPLORATION WITH RELATIONSHIP MAPPING

(71) Applicant: Cisco Technology, Inc., San Jose, CA (US)

(72) Inventors: Carlo Zapponi, London (GB); Sukrit Dasgupta, Norfolk, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/393,767

(22) Filed: Apr. 24, 2019

(65) Prior Publication Data
US 2020/0162344 A1 May 21, 2020

Related U.S. Application Data

(60) Provisional application No. 62/769,689, filed on Nov. 20, 2018.

(51) Int. Cl.
*H04L 12/24* (2006.01)
(52) U.S. Cl.
CPC ............ *H04L 41/22* (2013.01); *H04L 41/044* (2013.01); *H04L 41/12* (2013.01)
(58) Field of Classification Search
CPC ....... H04L 41/22; H04L 41/044; H04L 41/12; H04L 41/16; H04L 41/5096; H04L 43/045; H04L 41/20
See application file for complete search history.

(56) References Cited

U.S. PATENT DOCUMENTS

| 5,049,873 A | * | 9/1991 | Robins | H04L 45/02 340/2.1 |
| 5,909,217 A | * | 6/1999 | Bereiter | G06F 3/0489 345/440 |
| 6,040,834 A | * | 3/2000 | Jain | H04L 41/06 709/223 |

(Continued)

OTHER PUBLICATIONS

"Network Insight," Infoblox.com, Infoblox, 2018, pp. 1-11.

*Primary Examiner* — Yongjia Pan
(74) *Attorney, Agent, or Firm* — Polsinelli PC

(57) ABSTRACT

The technology provides for providing an interactive user interface to explore a complete network, see relationships with various aspects of the network, and drill down to details in an instinctive manner. In some embodiments, network component data is received that identifies metrics associated with network components. A graphical user interface made up of representations of network components of a network is presented, where the network components are selectable. Relevant network components are displayed at varying network scales by receiving an input selecting a first representation of a first network component at a first network level. Based on a network component relationship between the first representation of the first network component and a second relationship of a second network component, second network component data is received that identifies one or more metrics associated with the second network component. The second network component is at a second network level. The one or more metrics associated with the second network component are presented within a context of the second network level.

20 Claims, 19 Drawing Sheets

(56) References Cited

U.S. PATENT DOCUMENTS

| | | | |
|---|---|---|---|
| 6,456,306 B1* | 9/2002 | Chin | H04L 41/0213 |
| | | | 709/224 |
| 7,441,154 B2* | 10/2008 | Klotz | G06F 11/2257 |
| | | | 714/39 |
| 7,681,131 B1* | 3/2010 | Quarterman | H04L 41/22 |
| | | | 709/224 |
| 7,693,042 B1* | 4/2010 | Wei | H04L 41/0681 |
| | | | 370/216 |
| 8,185,824 B1 | 5/2012 | Mitchell et al. | |
| 9,223,946 B1* | 12/2015 | Circenis | G06F 21/128 |
| 9,350,618 B2 | 5/2016 | Bowler et al. | |
| 9,571,589 B2 | 2/2017 | Duleba et al. | |
| 9,870,389 B2 | 1/2018 | Elliot et al. | |
| 10,721,263 B2* | 7/2020 | Seiver | H04L 45/02 |
| 2002/0054169 A1* | 5/2002 | Richardson | H04L 41/0893 |
| | | | 715/854 |
| 2003/0046390 A1* | 3/2003 | Ball | H04L 41/12 |
| | | | 709/224 |
| 2004/0205182 A1* | 10/2004 | Geddes | H04L 41/16 |
| | | | 709/223 |
| 2007/0208840 A1* | 9/2007 | McConville | H04L 41/22 |
| | | | 709/223 |
| 2007/0240051 A1* | 10/2007 | Sherrill | G05B 23/0267 |
| | | | 715/700 |
| 2007/0253344 A1* | 11/2007 | Frost | H04L 12/2898 |
| | | | 370/254 |
| 2009/0092113 A1* | 4/2009 | Doshi | H04W 24/04 |
| | | | 370/338 |
| 2009/0327903 A1* | 12/2009 | Smith | H04L 43/50 |
| | | | 715/737 |
| 2011/0252327 A1* | 10/2011 | Awasthi | H04L 43/045 |
| | | | 715/736 |
| 2012/0054331 A1* | 3/2012 | Dagan | H04L 43/0817 |
| | | | 709/224 |
| 2012/0054554 A1* | 3/2012 | Dagan | G06F 11/079 |
| | | | 714/39 |
| 2013/0346857 A1* | 12/2013 | Zhang | H04L 41/12 |
| | | | 715/711 |
| 2016/0105325 A1* | 4/2016 | Fletcher | H04L 41/12 |
| | | | 715/737 |
| 2016/0239185 A1* | 8/2016 | Balimidi | G06F 3/0482 |
| 2016/0241436 A1* | 8/2016 | Fourie | H04L 47/2425 |
| 2017/0111236 A1* | 4/2017 | Bielenberg | H04L 41/22 |
| 2017/0257293 A1* | 9/2017 | Fletcher | G06F 9/45533 |

* cited by examiner

FIG. 3D

INTERACTIVE INTERFACE FOR NETWORK EXPLORATION WITH RELATIONSHIP MAPPING

CROSS-REFERENCE TO RELATED APPLICATIONS

This application claims priority to U.S. Provisional Application No. 62/769,689, filed on Nov. 20, 2018, the content of which is incorporated herein by reference in its entirety.

TECHNICAL FIELD

The subject matter of this disclosure relates in general to the field of computer networking, and more particularly, to systems and methods for improving the operation of an enterprise network.

BACKGROUND

A campus network can provide connectivity to computing devices (e.g., servers, workstations, desktop computers, laptop computers, tablets, mobile phones, etc.) and things (e.g., desk phones, security cameras, lighting, heating, ventilating, and air-conditioning (HVAC), windows, doors, locks, medical devices, industrial and manufacturing equipment, etc.) within environments such as offices, hospitals, colleges and universities, oil and gas facilities, factories, and similar locations. Some of the unique challenges a campus network may face include integrating wired and wireless devices, on-boarding computing devices and things that can appear anywhere in the network and maintaining connectivity when the devices and things migrate from location to location within the network, supporting bring your own device (BYOD) capabilities, connecting and powering Internet-of-Things (IoT) devices, and securing the network despite the vulnerabilities associated with Wi-Fi access, device mobility, BYOD, and IoT. Current approaches for deploying a network capable of providing these functions often require constant and extensive configuration and administration by highly skilled network engineers operating several different systems (e.g., directory-based identity services; authentication, authorization, and accounting (AAA) services, wireless local area network (WLAN) controllers; command line interfaces for each switch, router, or other network device of the network; etc.) and manually stitching these systems together. This can make network deployment difficult and time-consuming, and impede the ability of many organizations to innovate rapidly and to adopt new technologies, such as video, collaboration, and connected workspaces.

BRIEF DESCRIPTION OF THE FIGURES

To provide a more complete understanding of the present disclosure and features and advantages thereof, reference is made to the following description, taken in conjunction with the accompanying drawings, in which:

FIGS. 3A-3I illustrate examples of graphical user interfaces for a network management system in accordance with some embodiments;

DESCRIPTION OF EXAMPLE EMBODIMENTS

Figure 1:
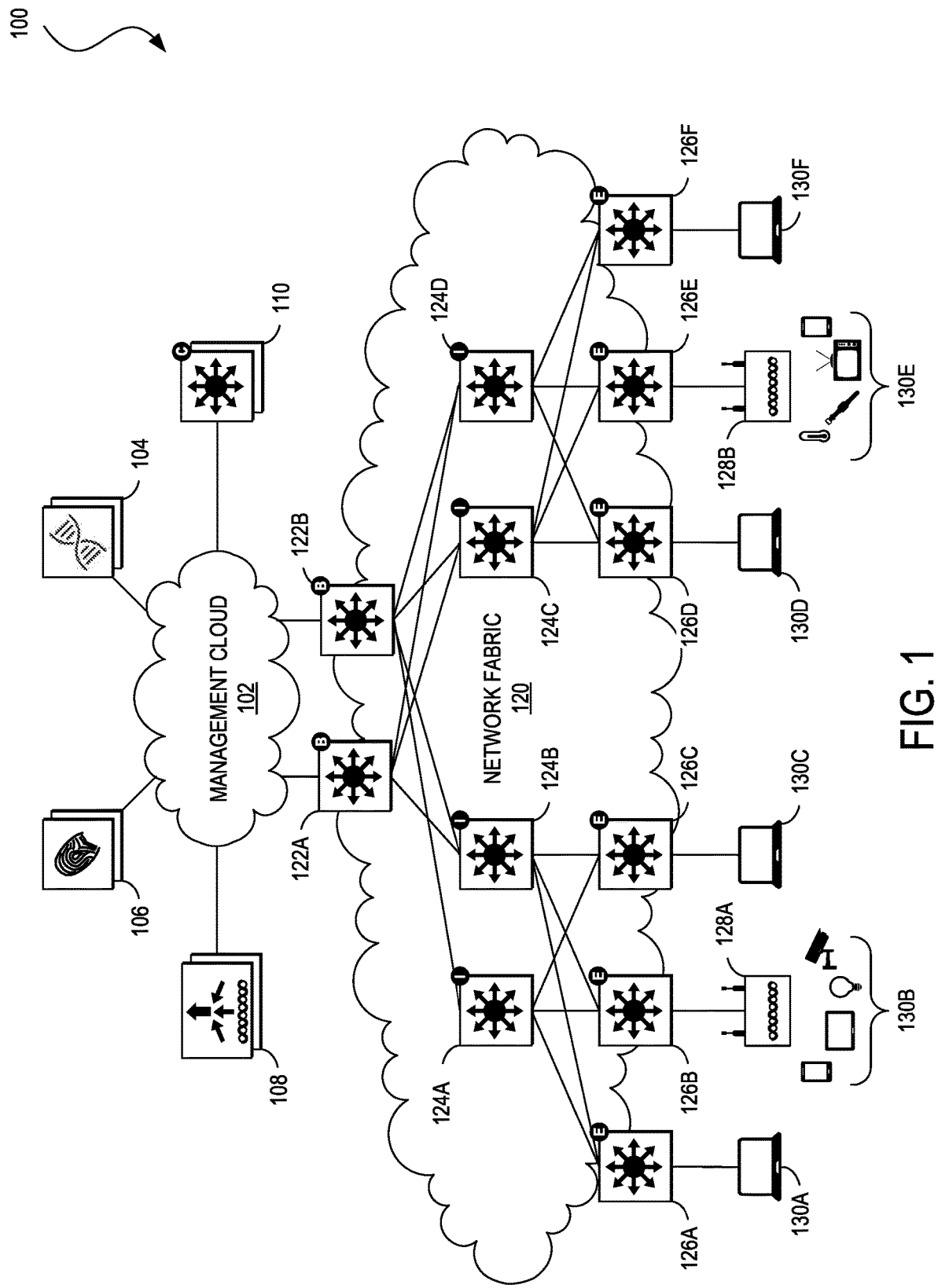
FIG. 1 illustrates an example of a physical topology of an enterprise network in accordance with some embodiments.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

The present technology provides for providing a purely interactive user interface to explore a complete network, see relationships with various aspects of the network, and drill down to details in an instinctive manner. In some embodiments, network component data is received that identifies metrics associated with network components. A graphical user interface made up of representations of network components of a network is presented, where the network components are selectable. Relevant network components are displayed at varying network scales by receiving an input selecting a first representation of a first network component at a first network level. Based on a network component relationship between the first representation of the first network component and a second relationship of a second network component, second network component data is received that identifies one or more metrics associated with the second network component. The second network component is at a second network level. The one or more metrics associated with the second network component are presented within a context of the second network level.

Example Embodiments

Many data visualization techniques have been used to display network characteristics by displaying the variations in key performance indicators (KPIs), operational status, etc. This methodology, however, is built on the principle of displaying data that a user must know where to look for and have an idea about in terms of its significance to network health. With modern day visualization methods and technologies, there is no way to start with a full abstraction of the complete network across multiple sites and interactively explore different aspects of the network. Such a workflow is getting increasingly important as networks are exploding in complexity, scale, and spanning the whole world. As a result, network operators need a workflow to explore their networks without looking for something specific. There is no current way to see all the relationships with users, applications, locations, issues, events in a fully UI based interactive experience.

This can be done through intent-based networking. Intent-based networking is an approach for overcoming the deficiencies, discussed above and elsewhere in the present disclosure, of conventional enterprise networks. The motivation of intent-based networking is to enable a user to describe in plain language what he or she wants to accomplish (e.g., the user's intent) and have the network translate the user's objective into configuration and policy changes that are automatically propagated across a complex and heterogeneous computing environment. Thus, an intent-based network can abstract network complexity, automate much of the work of provisioning and managing the network typically handled by a network administrator, and assure secure operation and optimal performance of the network. As an intent-based network becomes aware of the users, devices, and things making connections in the network, it can automatically apply security permissions and service levels in accordance with the privileges and quality of experience (QoE) assigned to the users, devices, and things. Table 1 sets forth examples of intents and workflows that can be automated by an intent-based network to achieve a desired outcome.

TABLE 1

Examples of Intents and Associated Workflows

| Intent | Workflow |
| --- | --- |
| I need to scale out my application database | Extend network segments; update load balancer configuration; configure quality of service (QoS) |
| I have scheduled a telemedicine session at 10am | Create high-definition (HD) video connection; prioritize with end-to-end QoS; validate performance; keep the communication safe; tear down connection after call |
| I am rolling out a new IoT app for factory equipment monitoring | Create a new segment for all factory devices to connect to the IoT app; isolate from other traffic; apply service level agreement (SLA); validate SLA; optimize traffic flow |
| I need to deploy a secure multi-tier application | Provision multiple networks and subnets; configure access control lists (ACLs) and firewall rules; advertise routing information |

Some additional examples of use cases of an intent-based network:
  An intent-based network can learn the performance needs of applications and services and adapt the network from end-to-end to achieve specified service levels;
  Instead of sending technicians to every office, floor, building, or branch, an intent-based network can discover and identify devices and things as they connect, assign security and micro-segmentation profiles according to established policies, and continuously monitor access point performance to automatically adjust for QoE;
  Users can move freely among network segments, mobile device in hand, and automatically connect with the correct security and access privileges;
  Switches, routers, and other network devices can be powered up by local non-technical office personnel, and the network devices can be configured remotely (by a user or by the network) via a cloud management console with the appropriate policies as defined by the intents for the specific location (e.g., permanent employee access, visiting employee access, guest access, etc.); and
  Machine learning and artificial intelligence agents running in the network can continuously monitor and analyze network traffic and connections, compare activity against pre-defined intents such as application performance or security policies, detect malware intrusions in encrypted traffic and automatically isolate infected devices, and provide a historical record of network events for analysis and troubleshooting.

FIG. 1 illustrates an example of a physical topology of an enterprise network 100 for providing intent-based networking. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment as discussed further below with respect to FIG. 4A.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco *Nexus*® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles;

smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
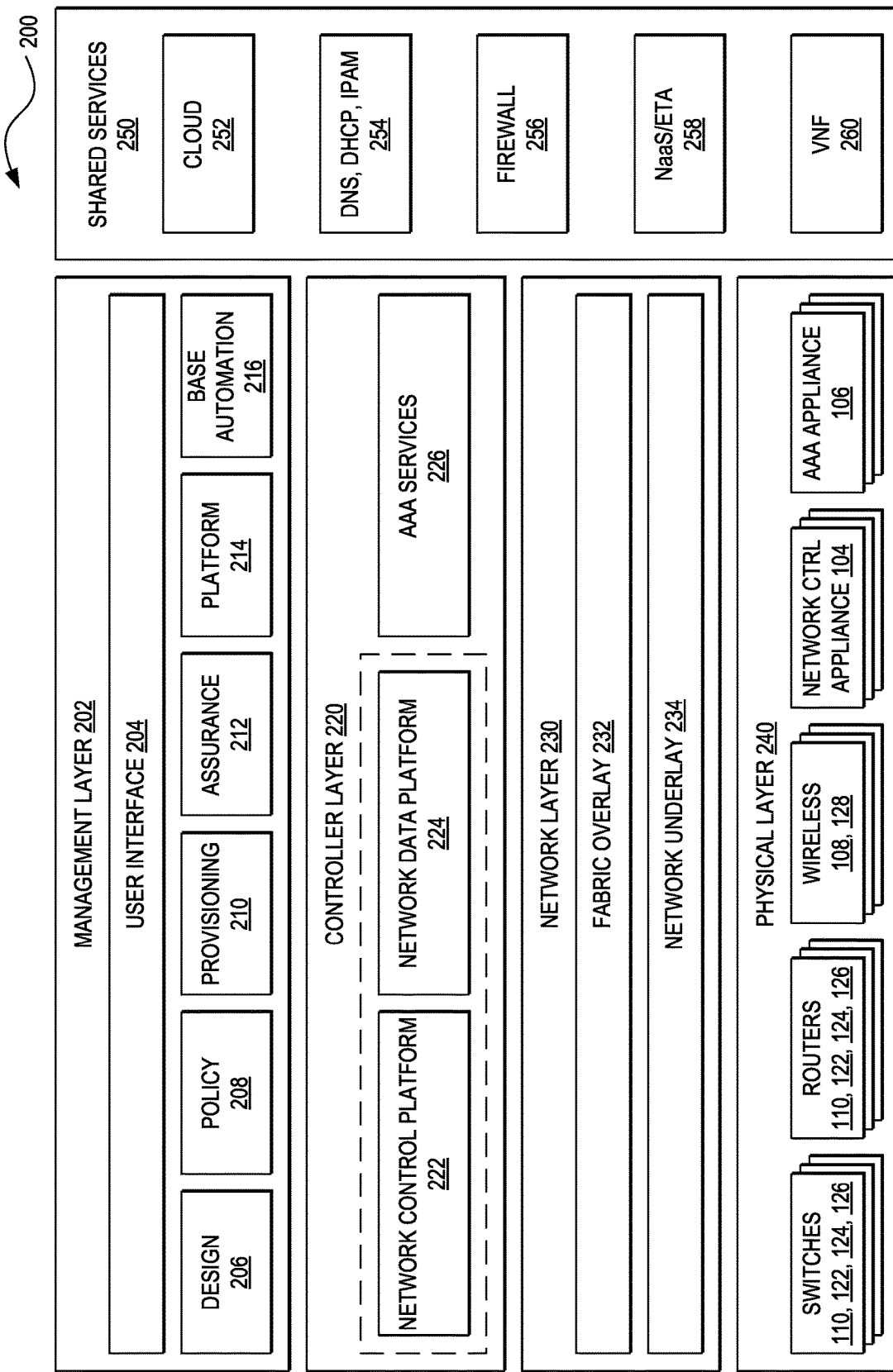
FIG. 2 illustrates an example of a logical architecture for an enterprise network in accordance with some embodiments.

FIG. 2 illustrates an example of a logical architecture 200 for an enterprise network (e.g., the enterprise network 100). One of ordinary skill in the art will understand that, for the logical architecture 200 and any system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

FIGS. 3A-3I illustrate examples of graphical user interfaces for implementing the user interface 204. Although FIGS. 3A-3I show the graphical user interfaces as comprising webpages displayed in a browser executing on a large form-factor general purpose computing device (e.g., server, workstation, desktop, laptop, etc.), the principles disclosed in the present disclosure are widely applicable to client devices of other form factors, including tablet computers, smart phones, wearable devices, or other small form-factor general purpose computing devices; televisions; set top boxes; IoT devices; and other electronic devices capable of connecting to a network and including input/output components to enable a user to interact with a network management system. One of ordinary skill will also understand that the graphical user interfaces of FIGS. 3A-3I are but one example of a user interface for managing a network. Other embodiments may include a fewer number or a greater number of elements.

Figure 3A:
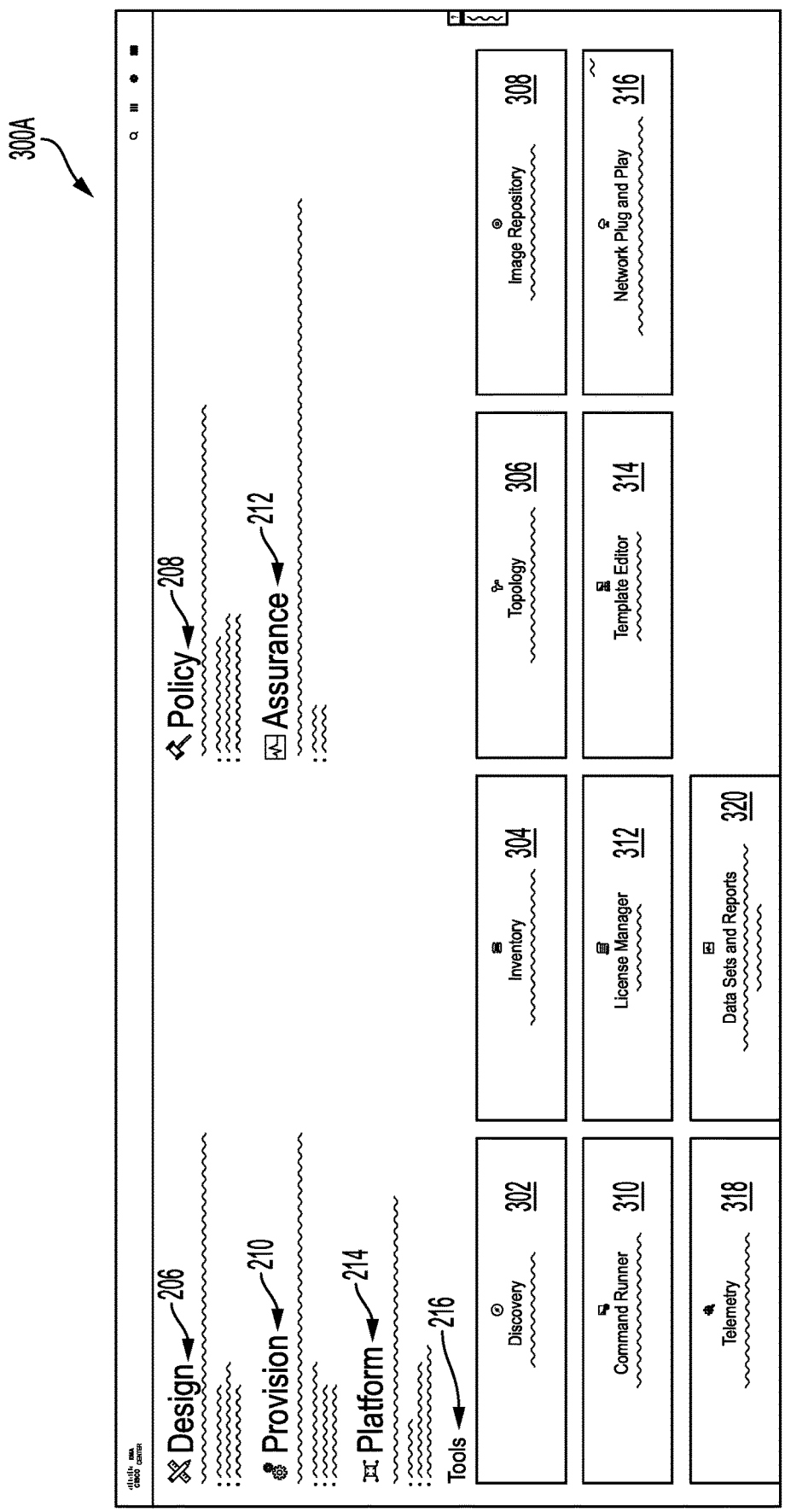

FIG. 3A illustrates a graphical user interface 300A, which is an example of a landing screen or a home screen of the user interface 204. The graphical user interface 300A can include user interface elements for selecting the design functions 206, the policy functions 208, the provisioning functions 210, the assurance functions 212, and the platform functions 214. The graphical user interface 300A also includes user interface elements for selecting the base automation functions 216. In this example, the base automation functions 216 include:

- A network discovery tool 302 for automating the discovery of existing network elements to populate into inventory;
- An inventory management tool 304 for managing the set of physical and virtual network elements;
- A topology tool 306 for visualizing the physical topology of network elements;
- An image repository tool 308 for managing software images for network elements;
- A command runner tool 310 for diagnosing one or more network elements based on a CLI;
- A license manager tool 312 for administering visualizing software license usage in the network;
- A template editor tool 314 for creating and authoring CLI templates associated with network elements in a design profile;
- A network PnP tool 316 for supporting the automated configuration of network elements;
- A telemetry tool 318 for designing a telemetry profile and applying the telemetry profile to network elements; and
- A data set and reports tool 320 for accessing various data sets, scheduling data extracts, and generating reports in multiple formats (e.g., Post Document Format (PDF), comma-separate values (CSV), Tableau, etc.), such as an inventory data report, a software image management (SWIM) server report, and a client data report, among others.

Figure 3B:
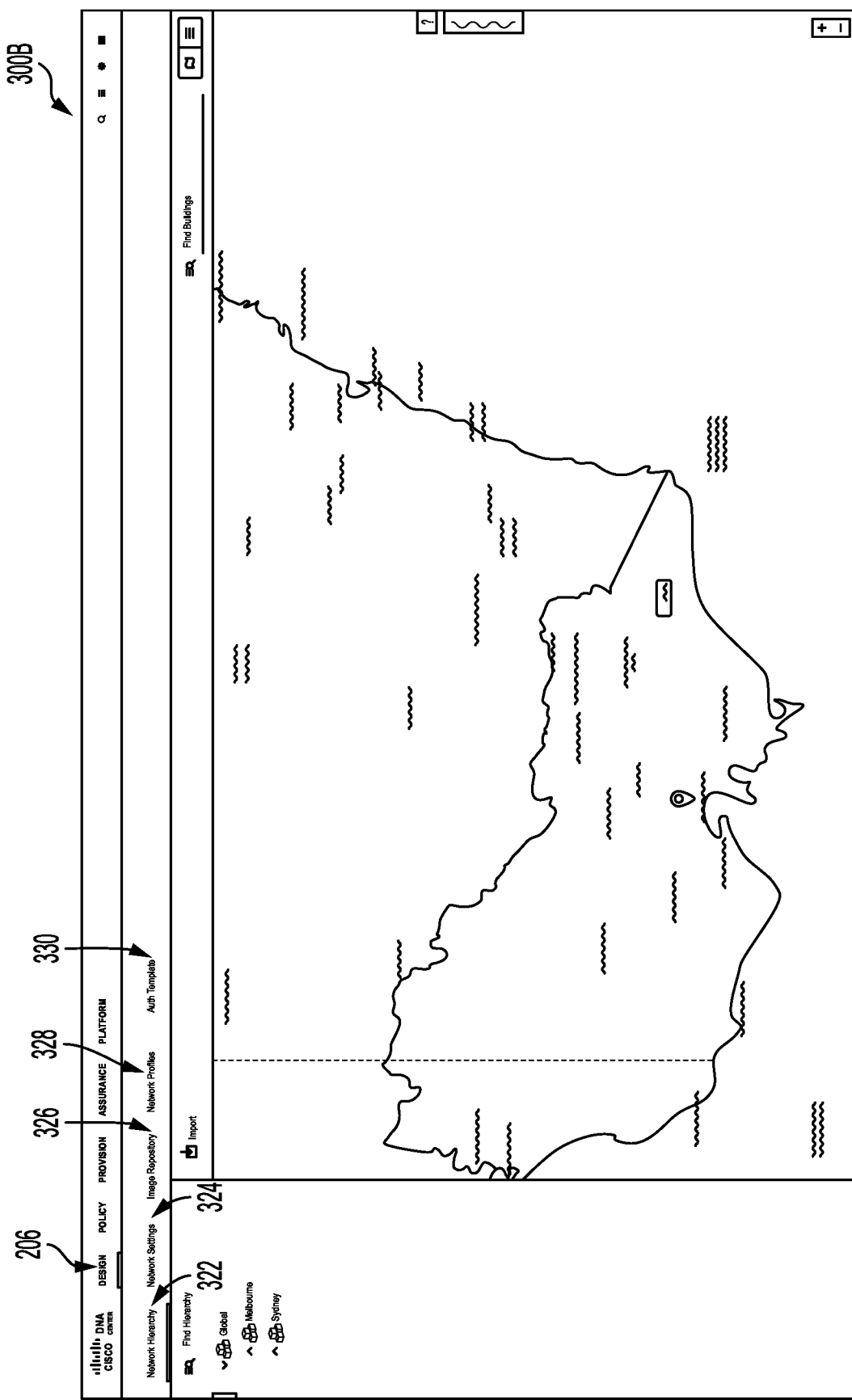

FIG. 3B illustrates a graphical user interface 300B, an example of a landing screen for the design functions 206. The graphical user interface 300B can include user interface elements for various tools and workflows for logically defining an enterprise network. In this example, the design tools and workflows include:

- A network hierarchy tool 322 for setting up the geographic location, building, and floor plane details, and associating these with a unique site id;
- A network settings tool 324 for setting up network servers (e.g., Domain Name System (DNS), DHCP, AAA, etc.), device credentials, IP address pools, service provider profiles (e.g., QoS classes for a WAN provider), and wireless settings;
- An image management tool 326 for managing software images and/or maintenance updates, setting version compliance, and downloading and deploying images;
- A network profiles tool 328 for defining LAN, WAN, and WLAN connection profiles (including Service Set Identifiers (SSIDs)); and
- An authentication template tool 330 for defining modes of authentication (e.g., closed authentication, Easy Connect, open authentication, etc.).

The output of the design workflow 206 can include a hierarchical set of unique site identifiers that define the global and forwarding configuration parameters of the various sites of the network. The provisioning functions 210 may use the site identifiers to deploy the network.

Figure 3C:
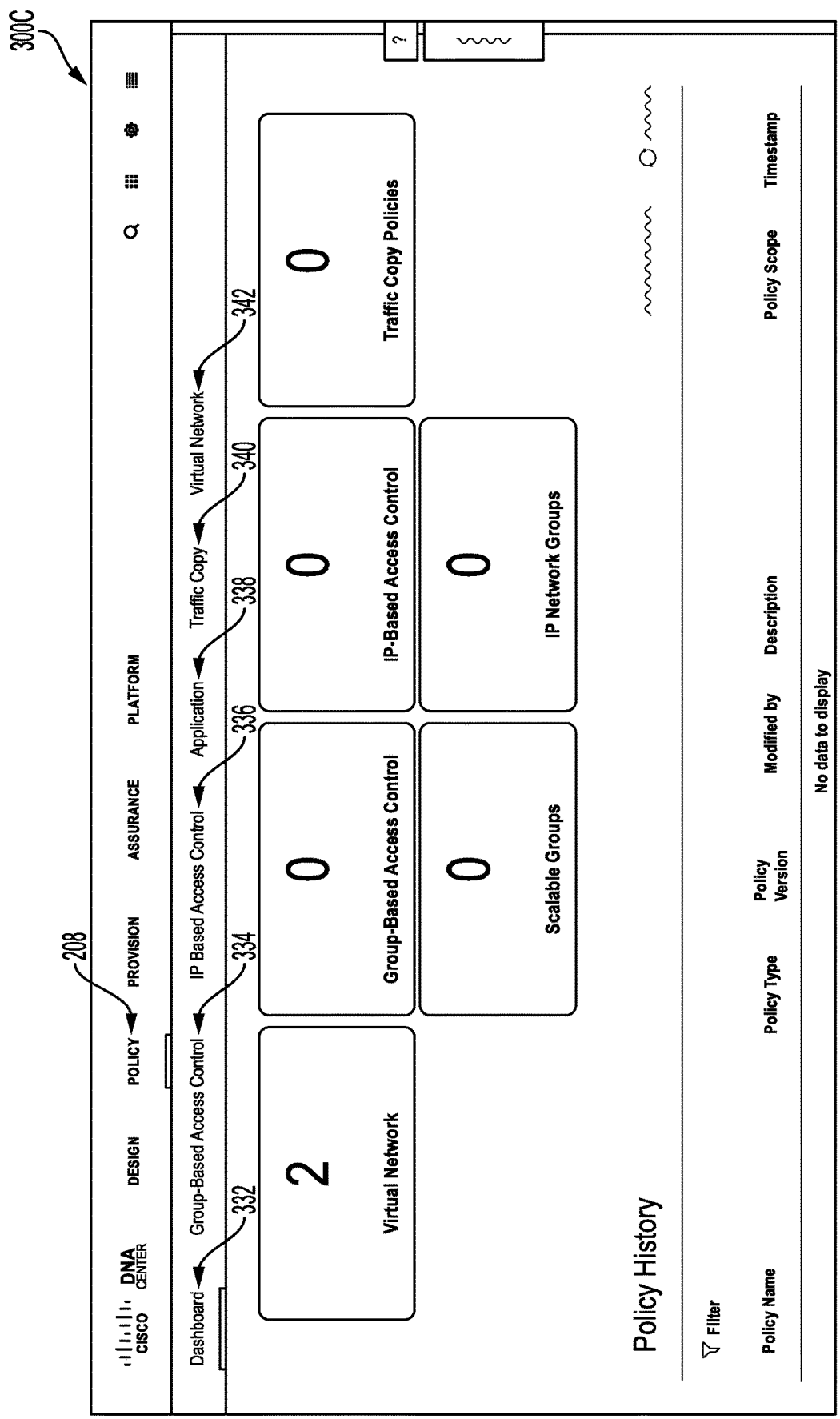

FIG. 3C illustrates a graphical user interface 300C, which is an example of a landing screen for the policy functions 208. The graphical user interface 300C can include various tools and workflows for defining network policies. In this example, the policy design tools and workflows include:

- A policy dashboard 332 for viewing virtual networks, group-based access control policies, IP-based access control policies, traffic copy policies, scalable groups, and IP network groups. The policy dashboard 332 can also show the number of policies that have failed to deploy. The policy dashboard 332 can provide a list of policies and the following information about each policy: policy name, policy type, policy version (e.g., iteration of policy which can be incremented each time the policy changes), user who has modified the policy, description, policy scope (e.g., user and device groups or applications that the policy affects), and timestamp;
- A group-based access control policies tool 334 for managing group-based access controls or Service Group Access Control Lists (SGACLs). A group-based access control policy can define scalable groups and an access contract (e.g., rules that make up the access control policies, such as permit or deny when traffic matches on the policy);
- An IP-based access control policies tool 336 for managing IP-based access control policies. An IP-based access control can define an IP network group (e.g., IP subnets that share same access control requirements) and an access contract;
- An application policies tool 338 for configuring QoS for application traffic. An application policy can define application sets (e.g., sets of applications with similar network traffic needs) and a site scope (e.g., the site to which an application policy is defined);
- A traffic copy policies tool 340 for setting up an Encapsulated Remote Switched Port Analyzer (ERSPAN) configuration such that network traffic flow between two entities is copied to a specified destination for monitoring or troubleshooting. A traffic copy policy can define the source and destination of the traffic flow to copy and a traffic copy contract that specifies the device and interface where the copy of traffic is sent; and
- A virtual network policies tool 343 for segmenting the physical network into multiple logical networks.

The output of the policy workflow 208 can include a set of virtual networks, security groups, and access and traffic policies that define the policy configuration parameters of the various sites of the network. The provisioning functions 210 may use the virtual networks, groups, and policies for deployment in the network.

Figure 3D:
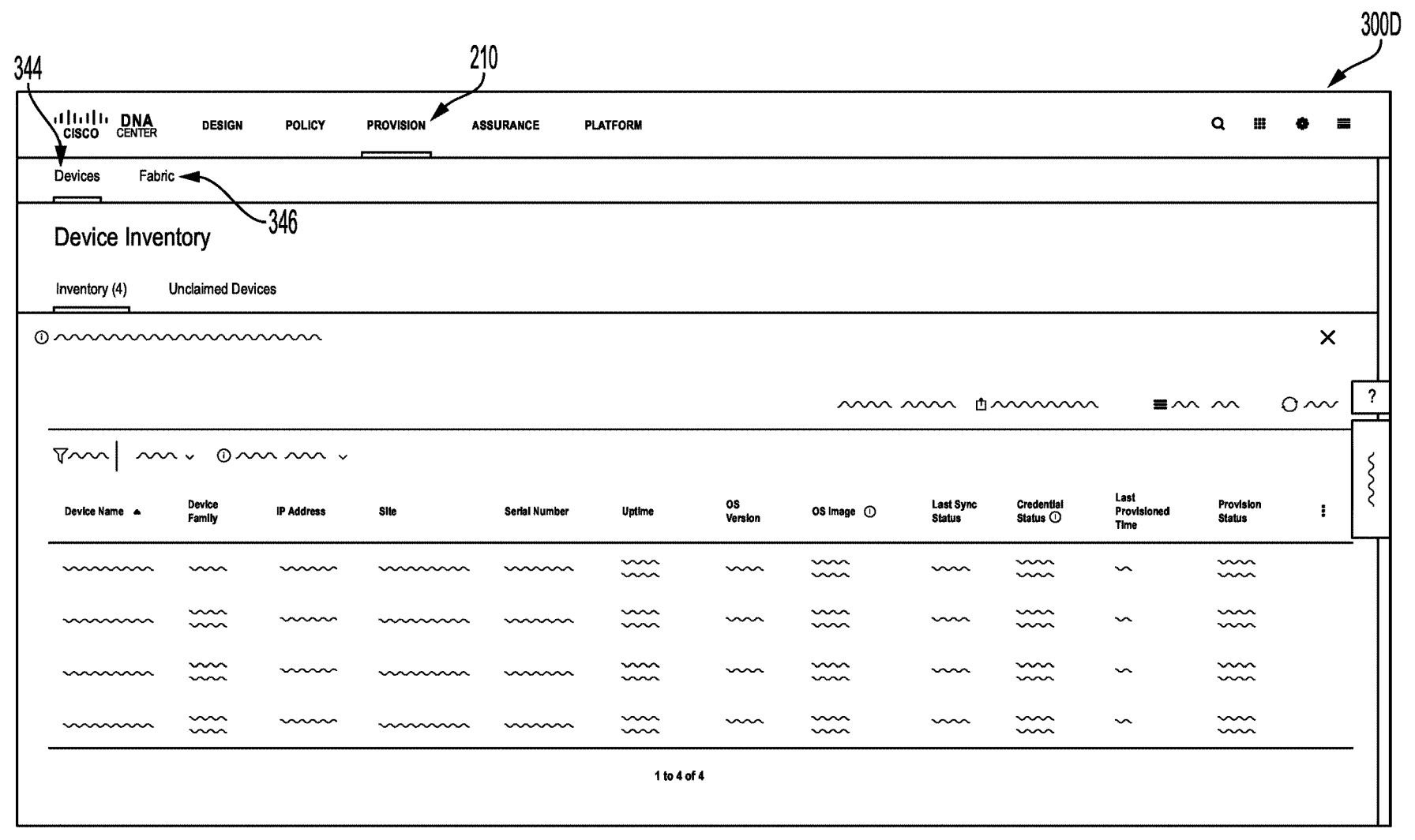

FIG. 3D illustrates a graphical user interface 300D, which is an example of a landing screen for the provisioning functions 210. The graphical user interface 300D can include various tools and workflows for deploying the network. In this example, the provisioning tools and workflows include:

A device provisioning tool 344 for assigning devices to the inventory and deploying the required settings and policies, and adding devices to sites; and A fabric provisioning tool 346 for creating fabric domains and adding devices to the fabric.

The output of the provisioning workflow 210 can include the deployment of the network underlay and fabric overlay, as well as policies (defined in the policy workflow 208).

Figure 3E:
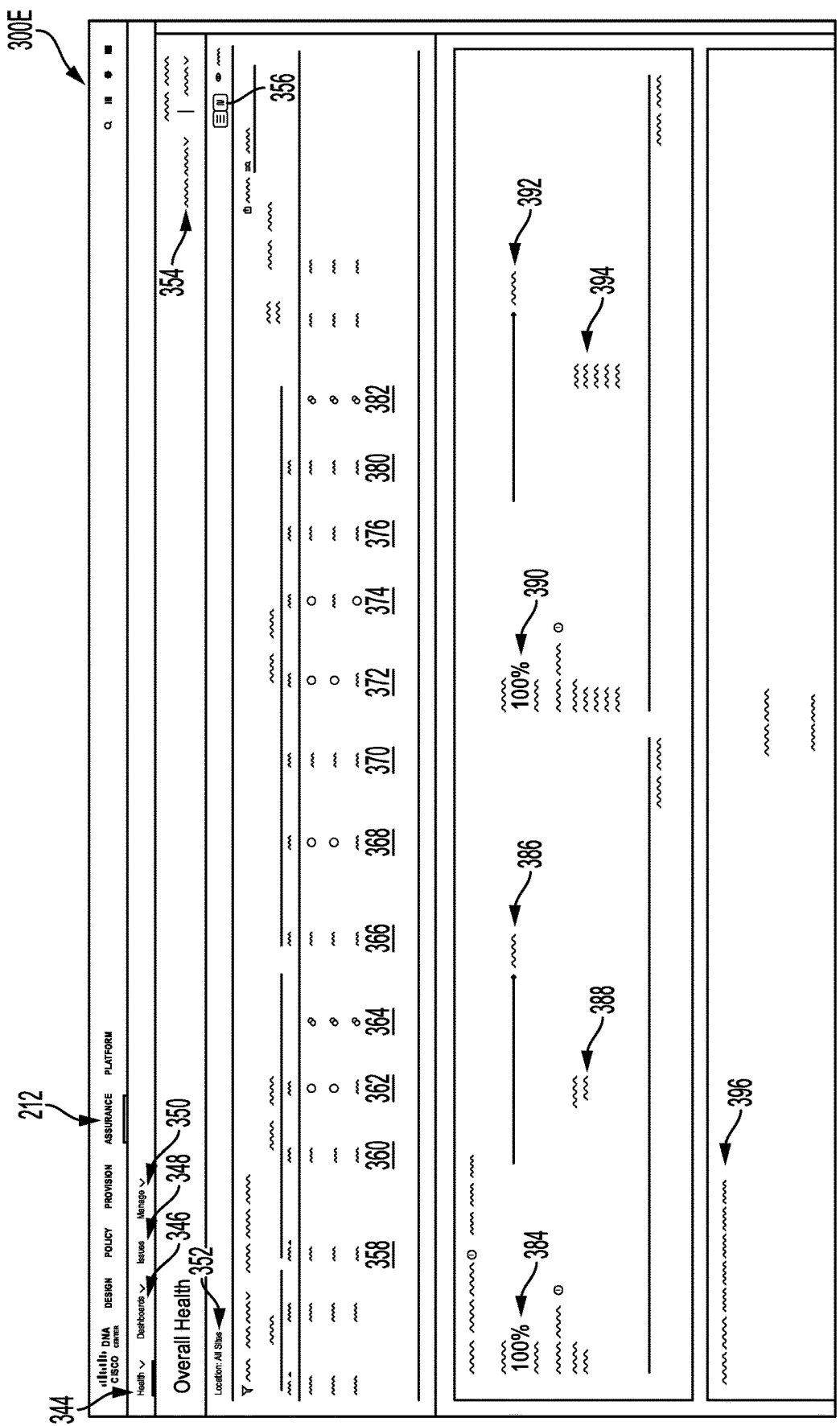

FIG. 3E illustrates a graphical user interface 300E, an example of a landing screen for the assurance functions 212. The graphical user interface 300E can include various tools and workflows for managing the network. In this example, the assurance tools and workflows include:

A health overview tool 344 for providing a global view of the enterprise network, including network infrastructure devices and endpoints. The user interface element (e.g., drop-down menu, a dialog box, etc.) associated with the health overview tool 344 can also be toggled to switch to additional or alternative views, such as a view of the health of network infrastructure devices alone, a view of the health of all wired and wireless clients, and a view of the health of applications running in the network as discussed further below with respect to FIGS. 3F-3H;

An assurance dashboard tool 346 for managing and creating custom dashboards;

An issues tool 348 for displaying and troubleshooting network issues; and

A sensor management tool 350 for managing sensor-driven tests.

The graphical user interface 300E can also include a location selection user interface element 352, a time period selection user interface element 354, and a view type user interface element 356. The location selection user interface element 354 can enable a user to view the overall health of specific sites (e.g., as defined via the network hierarchy tool 322) and/or network domains (e.g., LAN, WLAN, WAN, data center, etc.). The time period selection user interface element 356 can enable display of the overall health of the network over specific time periods (e.g., last 3 hours, last 24 hours, last 7 days, custom, etc.). The view type user interface element 355 can enable a user to toggle between a geographical map view of the sites of the network (not shown) or a hierarchical site/building view (as shown).

Within the hierarchical site/building view, rows can represent the network hierarchy (e.g. sites and buildings as defined by the network hierarchy tool 322); column 358 can indicate the number of healthy clients as a percentage; column 360 can indicate the health of wireless clients by a score (e.g., 1-10), color and/or descriptor (e.g., red or critical associated with a health score 1 to 3 indicating the clients have critical issues, orange or warning associated with a health score of 4 to 7 indicating warnings for the clients, green or no errors or warnings associated with a health score of 8 to 10, grey or no data available associated with a health score of null or 0), or other indicator; column 362 can indicate the health of wired clients by score, color, descriptor, and so forth; column 364 can include user interface elements for drilling down to the health of the clients associated with a hierarchical site/building; column 366 can indicate the number of healthy network infrastructure devices as a percentage; column 368 can indicate the health of access switches by score, color, descriptor, and so forth; column 370 can indicate the health of core switches by score, color, descriptor, and so forth; column 372 can indicate the health of distribution switches by score, color, descriptor, and so forth; column 374 can indicate the health of routers by score, color, descriptor, and so forth; column 376 can indicate the health of WLCs by score, color, descriptor, and so forth; column 378 can indicate the health of other network infrastructure devices by score, color, descriptor, and so forth; and column 380 can include user interface elements for drilling down to the health of the network infrastructure devices associated with a hierarchical site/building. In other embodiments, client devices may be grouped in other ways besides wired or wireless, such as by device type (e.g., desktop, laptop, mobile phone, IoT device or more specific type of IoT device, etc.), manufacturer, model, operating system, and so forth. Likewise, network infrastructure devices can also be grouped along these and other ways in additional embodiments.

The graphical user interface 300E can also include an overall health summary user interface element (e.g., a view, pane, tile, card, container, widget, dashlet, etc.) that includes a client health summary user interface element 384 indicating the number of healthy clients as a percentage, a color coded trend chart 386 indicating that percentage over a specific time period (e.g., as selected by the time period selection user interface element 354), a user interface element 388 breaking down the number of healthy clients as a percentage by client type (e.g., wireless, wired), a network infrastructure health summary user interface element 390 indicating the number of health network infrastructure devices as a percentage, a color coded trend chart 392 indicating that percentage over a specific time period, and a user interface element 394 breaking down the number of network infrastructure devices as a percentage by network infrastructure device type (e.g., core switch, access switch, distribution switch, etc.).

The graphical user interface 300E can also include an issues user interface element 396 listing issues, if any, that must be addressed. Issues can be sorted based on timestamp, severity, location, device type, and so forth. Each issue may be selected to drill down to view a more detailed view of the selected issue.

Figure 3F:
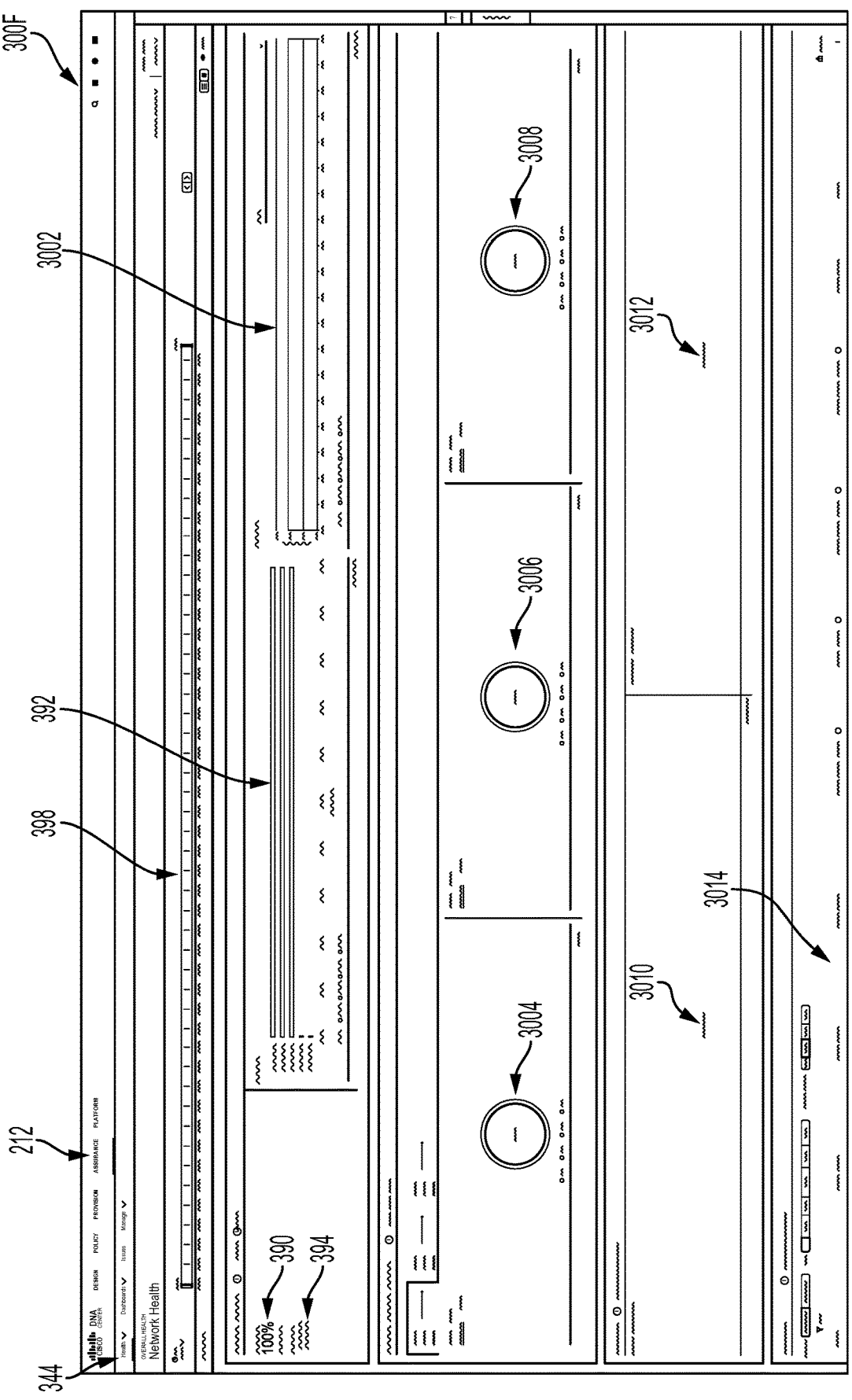

FIG. 3F illustrates a graphical user interface 300F, which is an example of a screen for an overview of the health of network infrastructure devices alone, which may be navigated to, for instance, by toggling the health overview tool 344. The graphical user interface 300F can include a timeline slider 398 for selecting a more granular time range than a time period selection user interface element (e.g., the time period selection user interface element 354). The graphical user interface 300F can also include similar information to that shown in the graphical user interface 300E, such as a user interface element comprising a hierarchical site/building view and/or geographical map view similar to that of the graphical user interface 300E (except providing information only for network infrastructure devices) (not shown here), the number of healthy network infrastructure devices as a percentage 390, the color coded trend charts 392 indicating that percentage by device type, the breakdown of the number of healthy network infrastructure devices by device type 394, and so forth. In addition, the graphical user interface 300F can display a view of the health of network infrastructure devices by network topology (not shown). This view can be interactive, such as by enabling a user to zoom in or out, pan left or right, or rotate the topology (e.g., by 90 degrees).

In this example, the graphical user interface 300F also includes a color coded trend chart 3002 showing the performance of the network infrastructure devices over a specific time period; network health by device type tabs including a system health chart 3004 providing system monitoring metrics (e.g., CPU utilization, memory utilization, temperature, etc.), a data plane connectivity chart 3006 providing data plane metrics, such as uplink availability and link errors, and a control plane connectivity chart 3008 providing control plane metrics for each device type; an AP analytics user interface element including an up and down color coded chart 3010 that provides AP status information (e.g., the number of APs connected to the network, and the number of APs not connected to the network, etc.) and a top number N of APs by client count chart 3012 that provides information about the APs that have the highest number of clients; a network devices table 3014 enabling a user to filter (e.g., by device type, health, or custom filters), view, and export network device information. A detailed view of the health of each network infrastructure device can also be provided by selecting that network infrastructure device in the network devices table 3014.

Figure 3G:
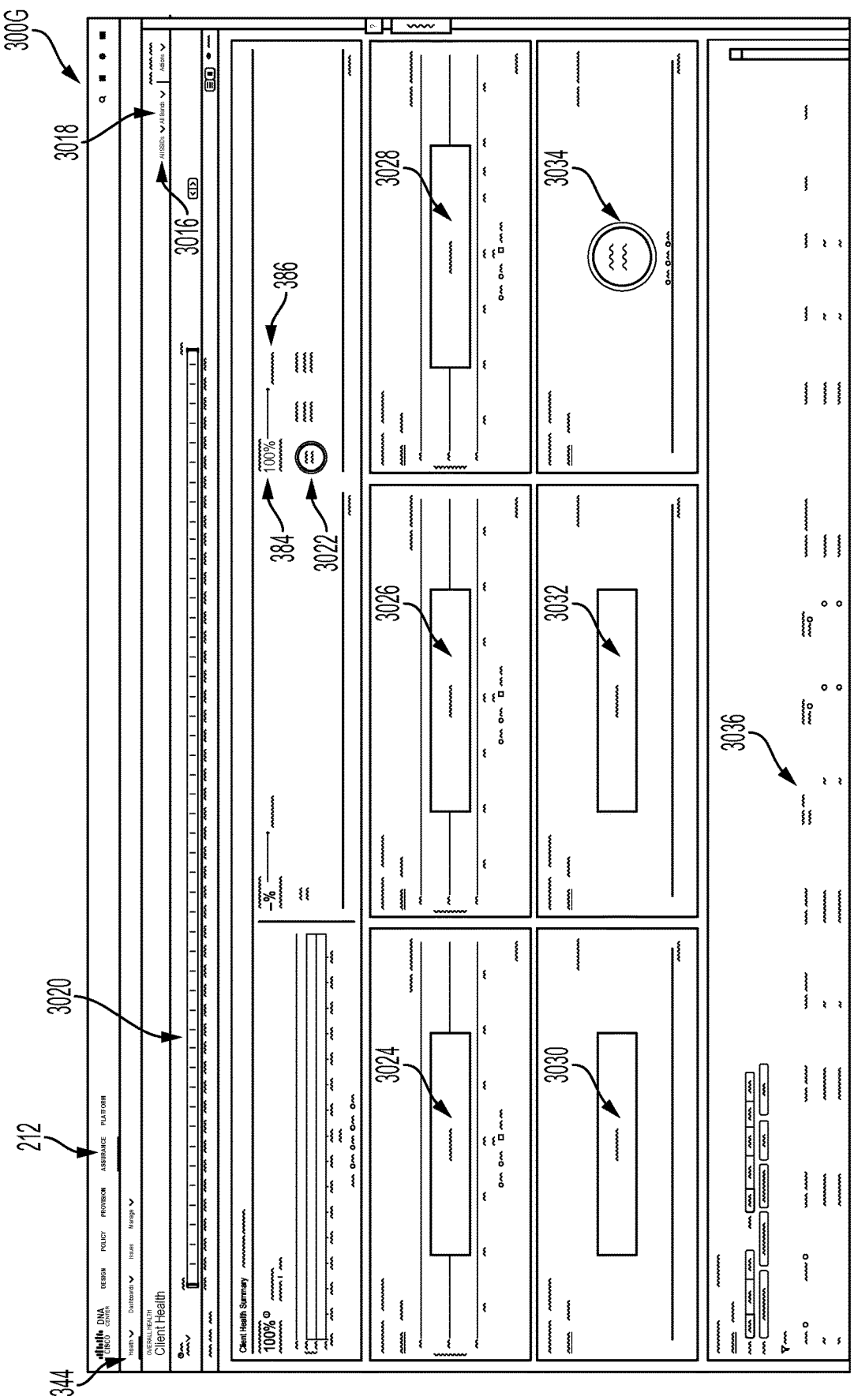

FIG. 3G illustrates a graphical user interface 300G, which is an example of a screen for an overview of the health of client devices, which may be navigated to, for instance, by toggling the health overview tool 344. The graphical user interface 300G can include an SSID user interface selection element 3016 for viewing the health of wireless clients by all SSIDs or a specific SSID, a band frequency user interface selection element 3018 for viewing the health of wireless clients by all band frequencies or a specific band frequency (e.g., 2.4 GHz, 5 GHz, etc.), and a time slider 3020 that may operate similarly to the time slider 398.

The graphical user interface 300G can also include a client health summary user interface element that provides similar information to that shown in the graphical user interface 300E, such as the number of healthy clients as a percentage 384 and a color coded trend chart 386 indicating that percentage over a specific time period for each grouping of client devices (e.g., wired/wireless, device type, manufacturer, model, operating system, etc.). In addition, the client health summary user interface element can include a color-coded donut chart that provides a count of poor (e.g., red and indicating a client health score of 1 to 3), fair (e.g., orange and indicating a client health score of 4 to 7), good (e.g., green and indicating a health score of 8 to 10), and inactive (e.g., grey and indicating a health score that is null or 0) client devices. The count of client devices associated with each color, health score, health descriptor, and so forth may be displayed by a selection gesture directed toward that color (e.g., tap, double tap, long press, hover, click, right-click, etc.).

The graphical user interface 300G can also include a number of other client health metric charts in all sites or a selected site over a specific time period, such as:
  Client onboarding times 3024;
  Received Signal Strength Indications (RSSIs) 3026;
  Connectivity signal-to-noise ratios (SNRs) 3028;
  Client counts per SSID 3030;
  Client counts per band frequency 3032;
  DNS requests and response counters (not shown); and
  Connectivity physical link state information 3034 indicating the distribution of wired client devices that had their physical links up, down, and had errors.

In addition, the graphical user interface 300G can include a client devices table 3036 enabling a user to filter (e.g., by device type, health, data (e.g., onboarding time>threshold, association time>threshold, DHCP>threshold, AAA>threshold, RSSI>threshold, etc.), or custom filters), view, and export client device information (e.g., user identifier, hostname, MAC address, IP address, device type, last heard, location, VLAN identifier, SSID, overall health score, onboarding score, connection score, network infrastructure device to which the client device is connected, etc.). A detailed view of the health of each client device can also be provided by selecting that client device in the client devices table 3036.

Figure 3H:
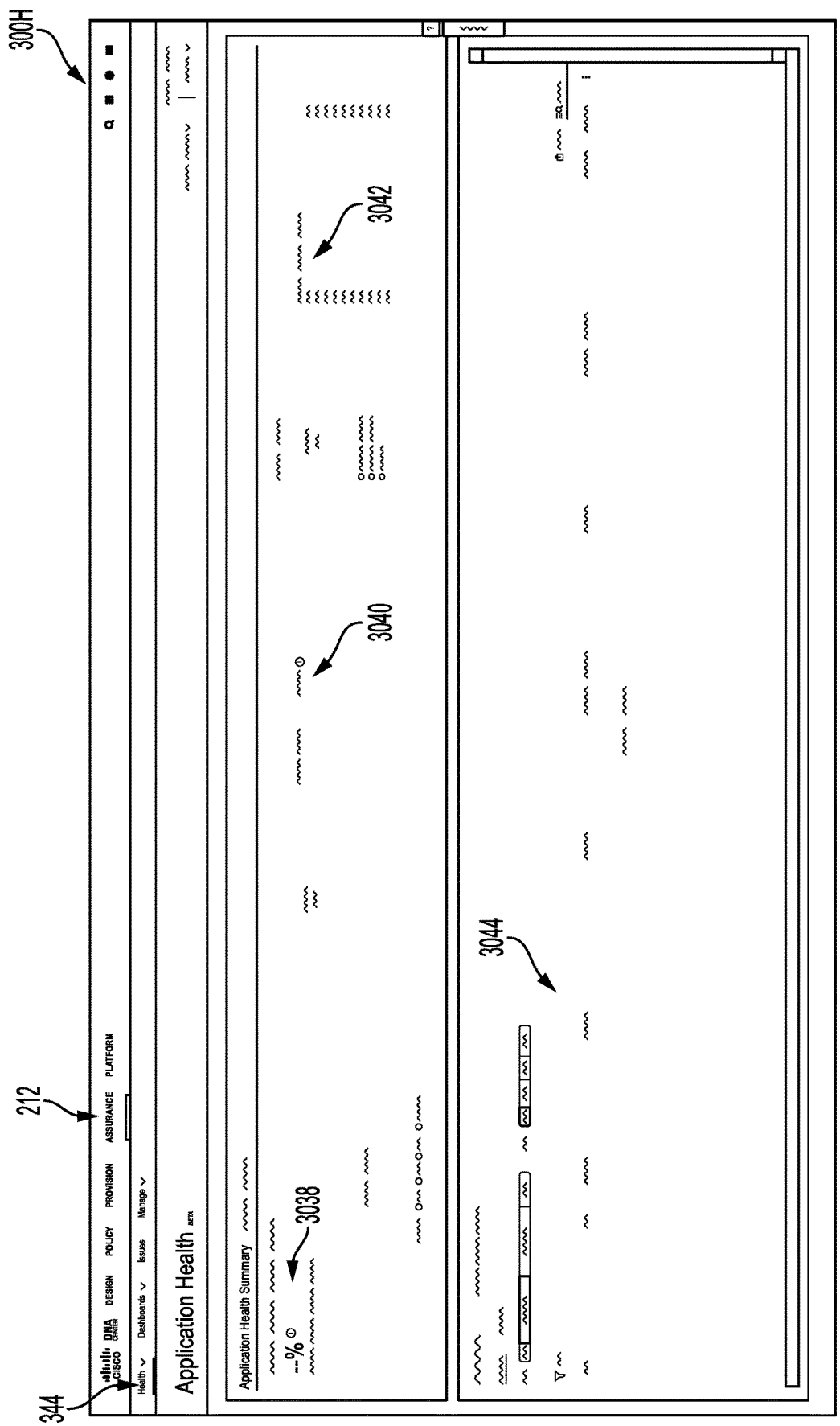

FIG. 3H illustrates a graphical user interface 300H, which is an example of a screen for an overview of the health of applications, which may be navigated to, for instance, by the toggling the health overview tool 344. The graphical user interface 300H can include application health summary user interface element including a percentage 3038 of the number of healthy applications as a percentage, a health score 3040 for each application or type of application (e.g., business relevant, business irrelevant, default; HTTP, VoIP, chat, email, bulk transfer, multimedia/streaming, etc.) running in the network, a top number N of applications by usage chart 3042. The health score 3040 can be calculated based on an application's qualitative metrics, such as packet loss, network latency, and so forth.

In addition, the graphical user interface 300H can also include an applications table 3044 enabling a user to filter (e.g., by application name, domain name, health, usage, average throughput, traffic class, packet loss, network latency, application latency, custom filters, etc.), view, and export application information. A detailed view of the health of each application can also be provided by selecting that application in the applications table 3044.

Figure 3I:
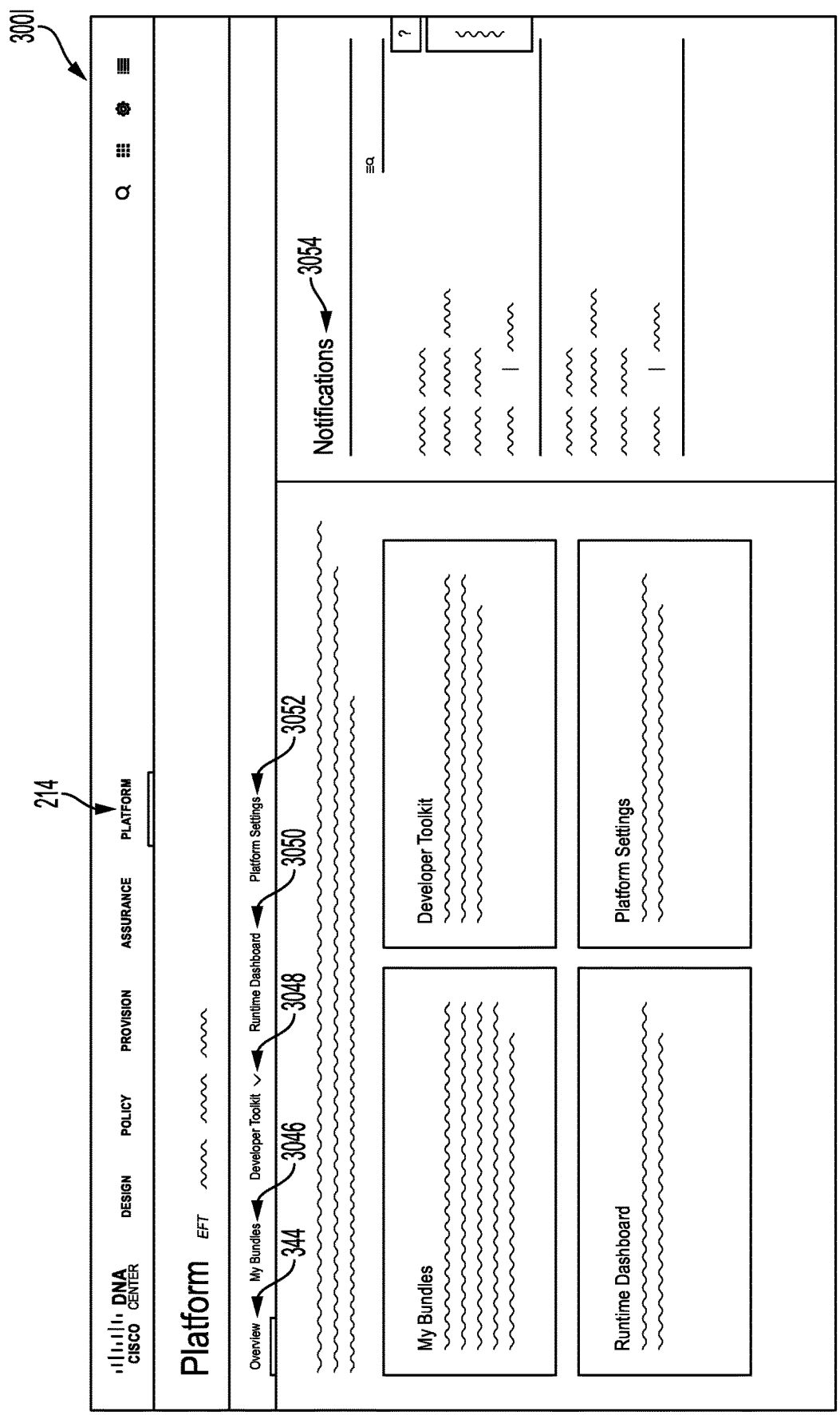

FIG. 3I illustrates an example of a graphical user interface 300I, which is an example of a landing screen for the platform functions 210. The graphical user interface 300I can include various tools and workflows for integrating with other technology systems. In this example, the platform integration tools and workflows include:
  A bundles tool 3046 for managing packages of domain-specific APIs, workflows, and other features for network programming and platform integration;
  A developer toolkit 3048 for accessing an API catalog listing the available APIs and methods (e.g., GET, PUT, POST, DELETE, etc.), descriptions, runtime parameters, return codes, model schemas, and so forth. In some embodiments, the developer toolkit 3048 can also include a "Try It" button to permit a developer to experiment with a particular API to better understand its behavior;
  A runtime dashboard 3050 for viewing and analyzing basic metrics or API and integration flow usage;
  A platform settings tool 3052 to view and set global or bundle-specific settings that define integration destinations and event consumption preferences; and
  A notifications user interface element 3054 for presenting notifications regarding the availability of software updates, security threats, and so forth.

Returning to FIG. 2, the controller layer 220 can comprise subsystems for the management layer 220 and may include a network control platform 222, a network data platform 224, and AAA services 226. These controller subsystems can form an abstraction layer to hide the complexities and dependencies of managing many network elements and protocols.

The network control platform 222 can provide automation and orchestration services for the network layer 230 and the physical layer 240, and can include the settings, protocols, and tables to automate management of the network and physical layers. For example, the network control platform 230 can provide the design functions 206, the provisioning functions 210, the policy functions 208, and/or the assurance functions 212. In addition, the network control platform 230 can include tools and workflows for discovering switches, routers, wireless controllers, and other network infrastructure devices (e.g., the network discovery tool 302); maintaining network and endpoint details, configurations, and software versions (e.g., the inventory management tool 304); Plug-and-Play (PnP) for automating deployment of network infrastructure (e.g., the network PnP tool 316), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network elements using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 222

The network data platform 224 can provide for network data collection, analytics, and assurance, and may include the settings, protocols, and tables to monitor and analyze network infrastructure and endpoints connected to the network. The network data platform 224 can collect multiple types of information from network infrastructure devices, including syslog, SNMP, NetFlow, Switched Port Analyzer (SPAN), and streaming telemetry, among others. The network data platform 224 can also collect use contextual information shared from In some embodiments, one or more Cisco DNA™ Center appliances can provide the functionalities of the management layer 210, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 226 can provide identity and policy services for the network layer 230 and physical layer 240, and may include the settings, protocols, and tables to support endpoint identification and policy enforcement services. The AAA services 226 can provide tools and workflows to manage virtual networks and security groups, and to create group-based policies and contracts. The AAA services 226 can identify and profile network infrastructure devices and endpoints using AAA/RADIUS, 802.1X, MAC Authentication Bypass (MAB), web authentication, and EasyConnect, among others. The AAA services 226 can also collect and use contextual information from the network control platform 222, the network data platform 224, and the shared services 250, among others. In some embodiments, Cisco® ISE can provide the AAA services 226.

The network layer 230 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities.

Network elements of the underlay 234 can establish connectivity between each other, such as via Internet Protocol (IP). The underlay may use any topology and routing protocol.

In some embodiments, the network controller 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routes and query the map system to locate destination endpoints.

The fabric policy plane is where intent can be translated into network policy. That is, the policy plane is where the network operator can instantiate logical network policy based on services offered by the network fabric 120, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 120 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 120 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Scalable Group ACLs (SGACLs). The SGT can be used to provide address-agnostic group-based policies.

In some embodiments, the fabric control plane node 110 may implement the Locator/Identifier Separation Protocol (LISP) to communicate with one another and with the management cloud 102. Thus, the control plane nodes may operate a host tracking database, a map server, and a map resolver. The host tracking database can track the endpoints 130 connected to the network fabric 120 and associate the endpoints to the fabric edge nodes 126, thereby decoupling an endpoint's identifier (e.g., IP or MAC address) from its location (e.g., closest router) in the network.

The physical layer 240 can comprise network infrastructure devices, such as switches and routers 110, 122, 124, and 126 and wireless elements 108 and 128 and network appliances, such as the network controller appliance(s) 104, and the AAA appliance(s) 106.

The shared services layer 250 can provide an interface to external network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services layer 250 using APIs.

Figure 4A:
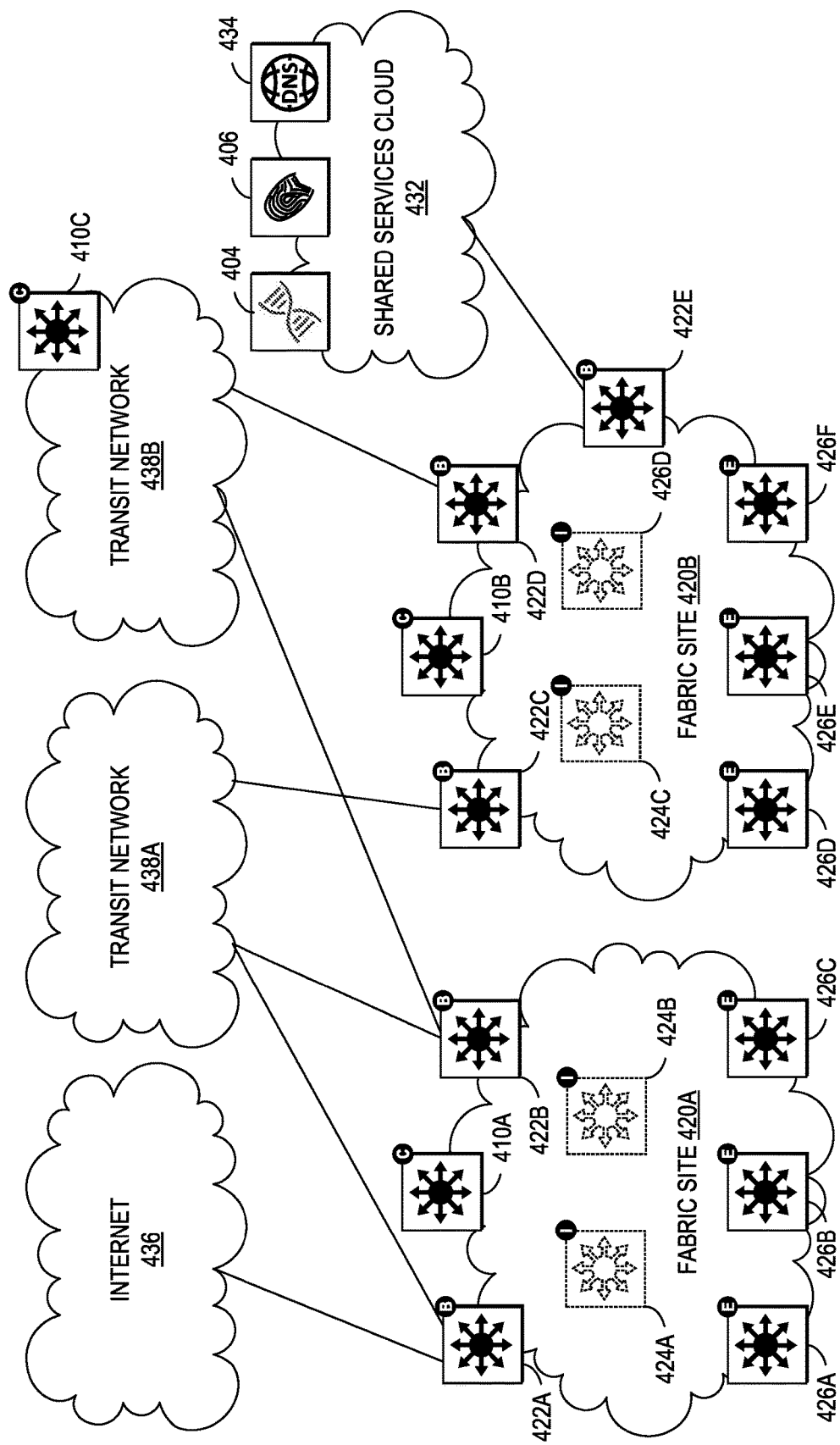
FIG. 4A illustrates an example of a physical topology for a multi-site enterprise network in accordance with some embodiments.

FIG. 4A illustrates an example of a physical topology for a multi-site enterprise network 400. In this example, the network fabric comprises fabric sites 420A and 420B. The fabric site 420A can include a fabric control node 410A, fabric border nodes 422A and 422B, fabric intermediate nodes 424A and 424B (shown here in dashed line and not connected to the fabric border nodes or the fabric edge nodes for simplicity), and fabric edge nodes 426A-D. The fabric site 420B can include a fabric control node 410B, fabric border nodes 422C-E, fabric intermediate nodes 424C and 424D, and fabric edge nodes 426D-F. Multiple fabric sites corresponding to a single fabric, such as the network fabric of FIG. 4A, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 436, traditional WAN 438A, Software-Defined WAN (SD-WAN) (not shown), or Software-Defined Access (SD-Access) 438B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network should be cable of carrying endpoint context information (e.g., VRF, SGT) across the network. Otherwise, a re-classification of the traffic may be needed at the destination site border.

The local control plane in a fabric site may only hold state relevant to endpoints that are connected to edge nodes within the local fabric site. The local control plane can register local endpoints via local edge nodes, as with a single fabric site (e.g., the network fabric 120). An endpoint that isn't explicitly registered with the local control plane may be assumed to be reachable via border nodes connected to the transit network. In some embodiments, the local control plane may not hold state for endpoints attached to other fabric sites such that the border nodes do not register information from the transit network. In this manner, the local control plane can be independent of other fabric sites, thus enhancing overall scalability of the network.

The control plane in the transit network can hold summary state for all fabric sites that it interconnects. This information can be registered to the transit control plane by border from different fabric sites. The border nodes can register EID information from the local fabric site into the transit network control plane for summary EIDs only and thus further improve scalability.

The multi-site enterprise network 400 can also include a shared services cloud 432. The shared services cloud 432 can comprise one or more network controller appliances 404, one or more AAA appliances 406, and other shared servers (e.g., DNS; DHCP; IPAM; SNMP and other monitoring tools; NetFlow, syslog, and other data collectors, etc.) may reside. These shared services can generally reside outside of the network fabric and in a global routing table (GRT) of an existing network. In this case, some method of inter-VRF routing may be required. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may require complex distribute-lists and prefix-lists to prevent loops.

However, there can be several disadvantages in using a fusion router to achieve inter-VN communication, such as route duplication because routes leaked from one VRF to another are programmed in hardware tables and can result in more TCAM utilization, manual configuration at multiple touch points wherever route-leaking is implemented, loss of SGT context because SGTs may not be maintained across VRFs and must be re-classified once the traffic enters the other VRF, and traffic hairpinning because traffic may need to be routed to the fusion router, and then back to the fabric border node.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane node(s) (e.g., software), and avoids hairpinning because inter-VN forwarding can occur at the fabric edge (e.g., the same intra-VN) so traffic does not need to hairpin at the border node. Another advantage is that a separate VN can be made for each of the common resources that are needed (e.g., a Shared Services VN, an Internet VN, a data center VN, etc.).

The present technology pertains to presenting a graphical user interface made up of representations of network components that can be useful to provide an intuitive, interactive user interface to explore a complete network, see relationships with various aspects of the network, and drill down to details in an instinctive manner.

Aspects of the disclosed technology addresses the need in the art for an interactive user interface that can allow a user to explore a portion of and/or the complete network, see relationships with various aspects of the network, and drill down to details in an instinctive manner. While network monitoring tools might provide reasonable mechanisms for monitoring network device health and traffic, their interfaces are hard to use, and not practical to use to view relationships between relevant network components at varying network scales. The present technology provides an interactive interface wherein every relevant network component can be viewed along with the relationships between them.

As described herein, the present technology pertains to a user interface for conveying relationships between network components (locations/sites [that include network devices], physical devices, data centers, applications, services, virtual network functions, etc.). In addition to displaying relationships between network components, the user interface can receive user inputs to select a network component to view, highlight, and/or change network scope regarding the displayed relationships in a detailed view.

Figure 4B:
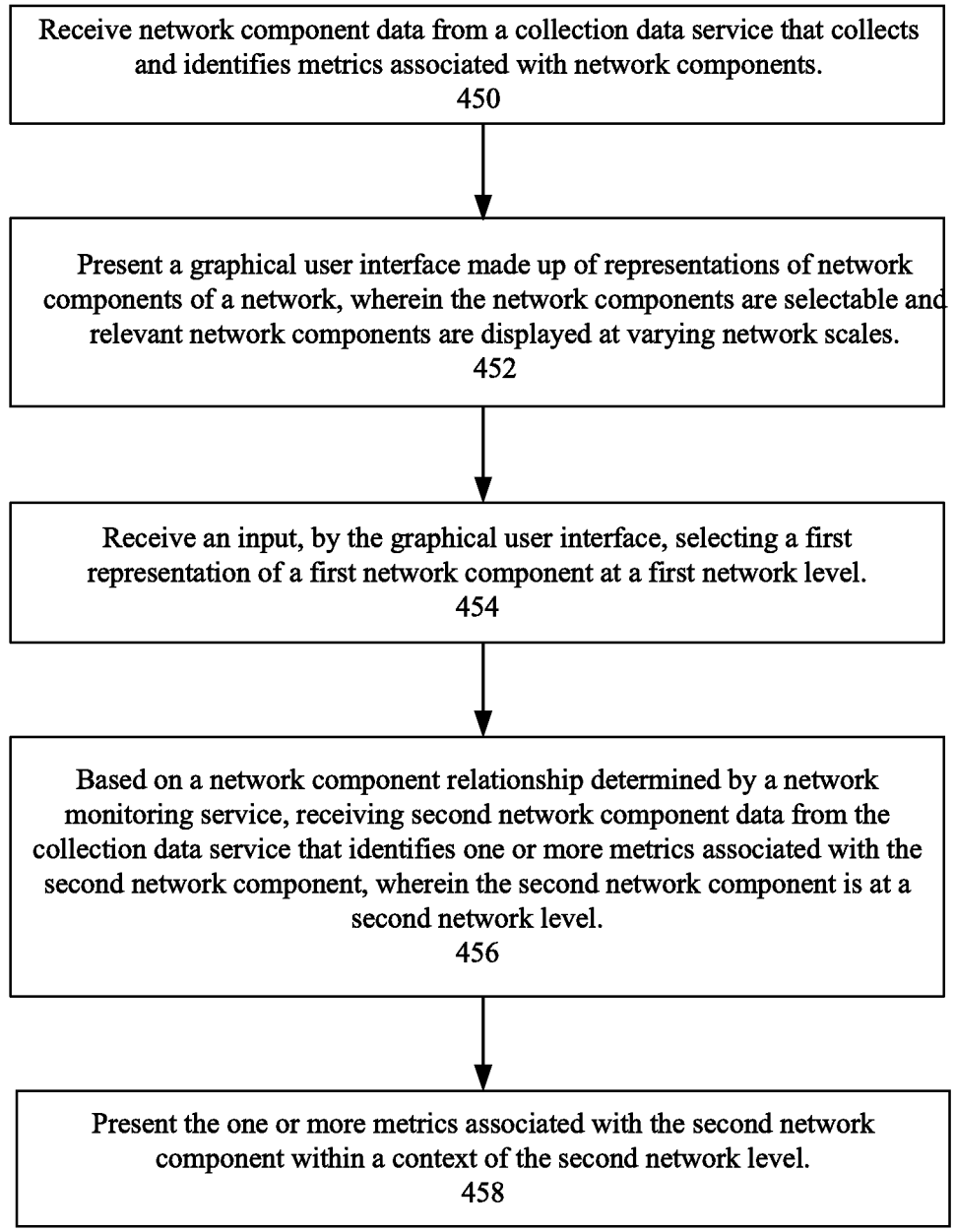
FIG. 4B illustrates a flowchart representation of presenting relevant network components in an interactive interface at varying network scales in accordance with some embodiments.

FIG. 4B is a flowchart representation presenting relevant network components in an interactive interface at varying network scales in accordance with some embodiments. In this embodiment, network component data can be received from a collection data service that collects and identifies metrics associated with network components (step 450). In some embodiments, the collection data service can be part of the overall system, and in some embodiments the collection data service can be a third party. Once network component data is received, a graphical user interface can be presented that is made up of representations of network components of the network (step 452). For example, the network components can be selectable representations.

In some embodiments, the relevant network components can be displayed at varying network scales. For example, the graphical user interface can receive an input from the user that selects a first representation of a first network component (step 454). The first representation of a first network component can be at a first network level. After the user selects the first representation of a first network component, second network component data can be received from the collection data service that identifies one or more metrics associated with the second network component, based on a network component relationship determined by a network monitoring service (step 456). For example, the network component relationship can be one or more relationships between the first representation of the first network component and a second relationship of a second network component. Network component relationships can be, for example, dependencies between components that affect their behavior within the computing system. In some embodiments, the second network component can be at a second network level, either higher or lower than the first network level. Thereafter, the one or more metrics associated with the second network component can be presented within a context of the second network level in the graphical user interface (step 458) (see FIGS. 5-9). The interactive user interface can include features including, but not limited to, the following:

1. Network Abstraction with Geo-Location:

Multiple network components within a network can be abstracted and mapped to each other according to one or more relationships between them. Abstracting a portion and/or all network entities within a network is difficult to implement and mapping them to one or more geographical locations is even harder. The abstraction of network components within the entire network can be accomplished through the intent-based networking of FIGS. 1-4. For example, a network abstraction component can create an abstraction of the network and map a portion or all of the abstracted network components to relative geographical locations. In some embodiments, the network abstraction component can be in response to receiving user input at the graphical user interface, and can abstract at a certain network level based on user input selecting the certain network level to be displayed. For example, FIGS. 5-9 illustrate example user interface implementations in accordance with various embodiments.

Figure 5:
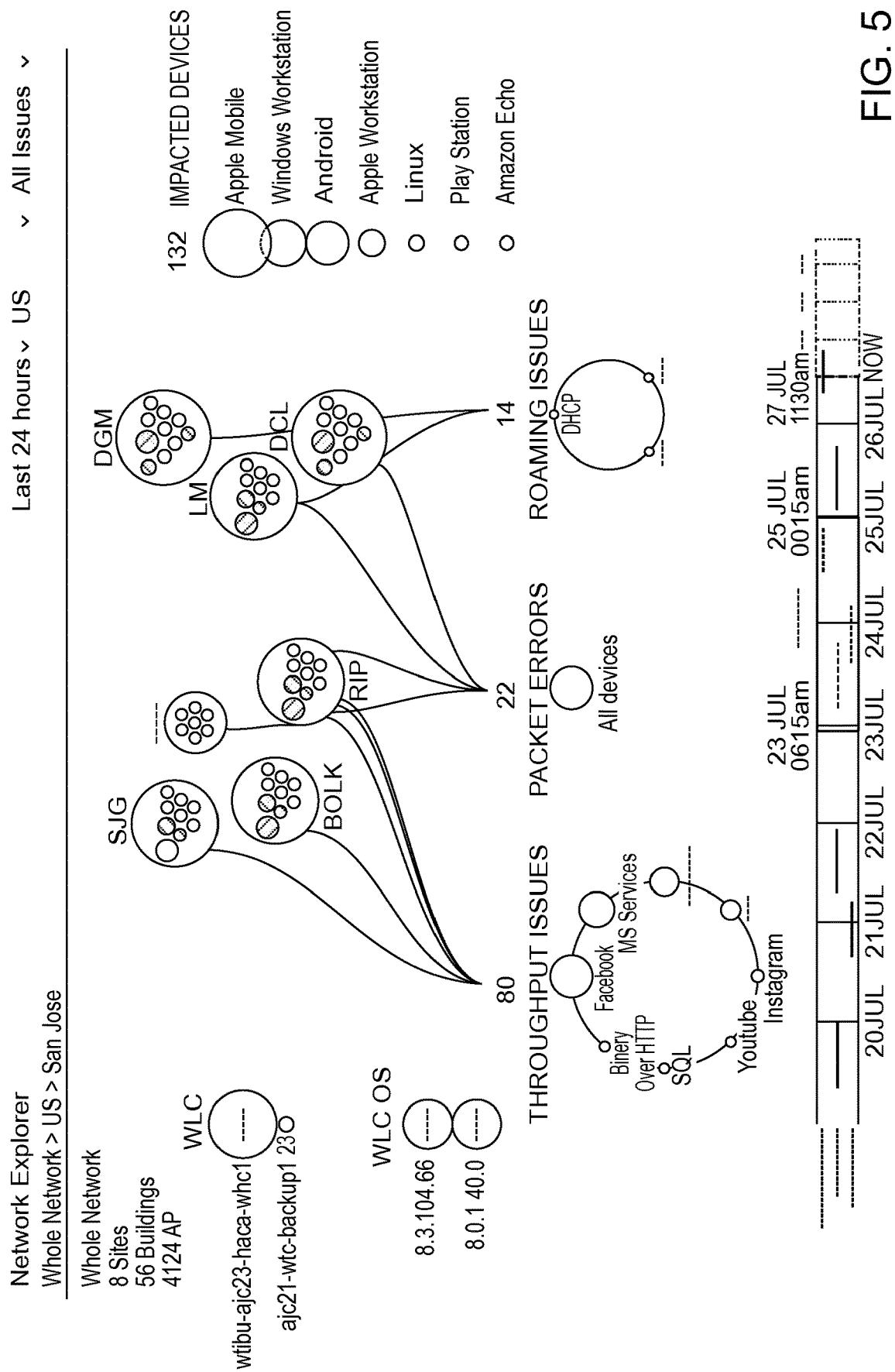
FIG. 5 illustrates an example user interface in accordance with some embodiments.
Figure 7:
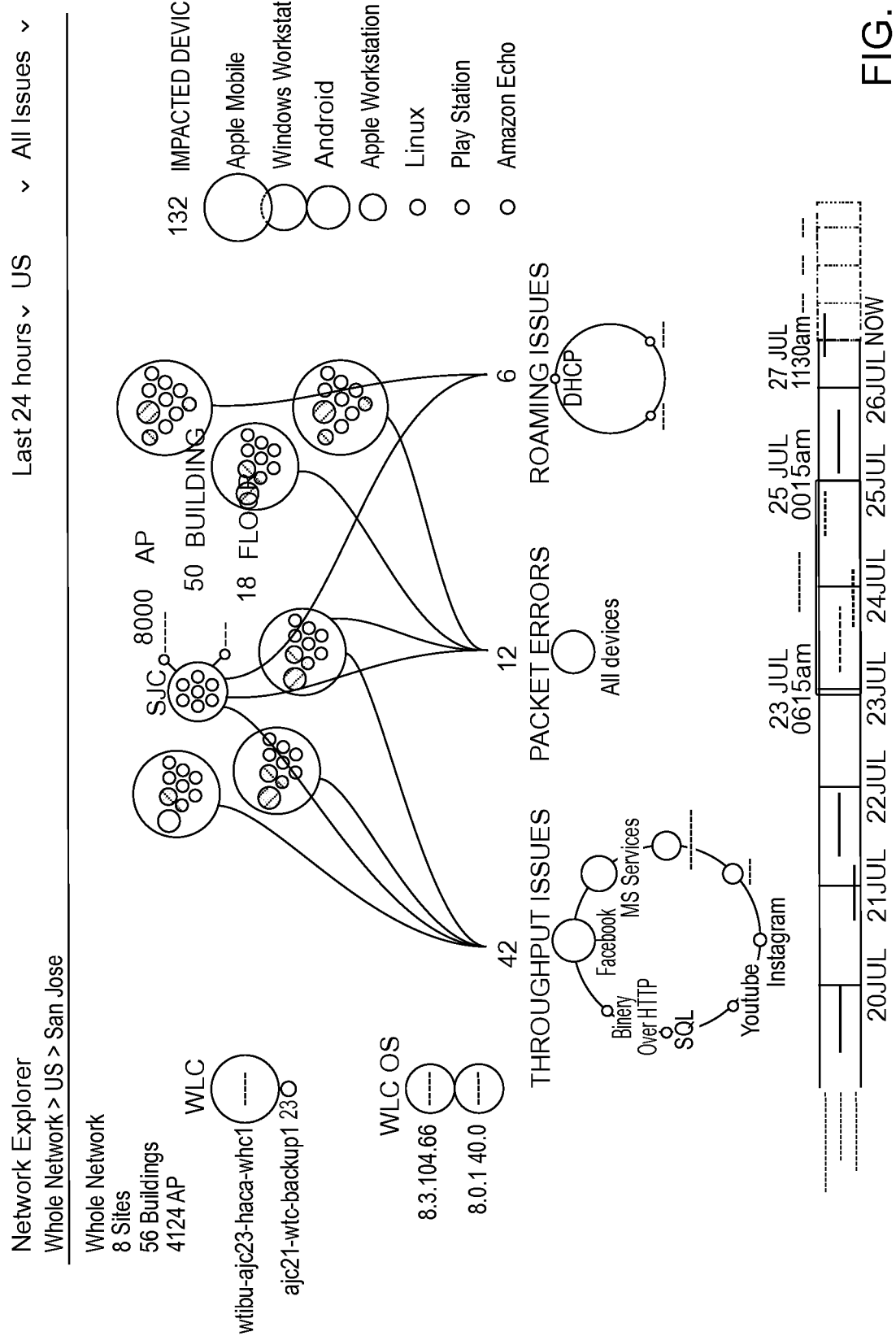
FIG. 7 illustrates an example user interface in accordance with some embodiments.
Figure 8:
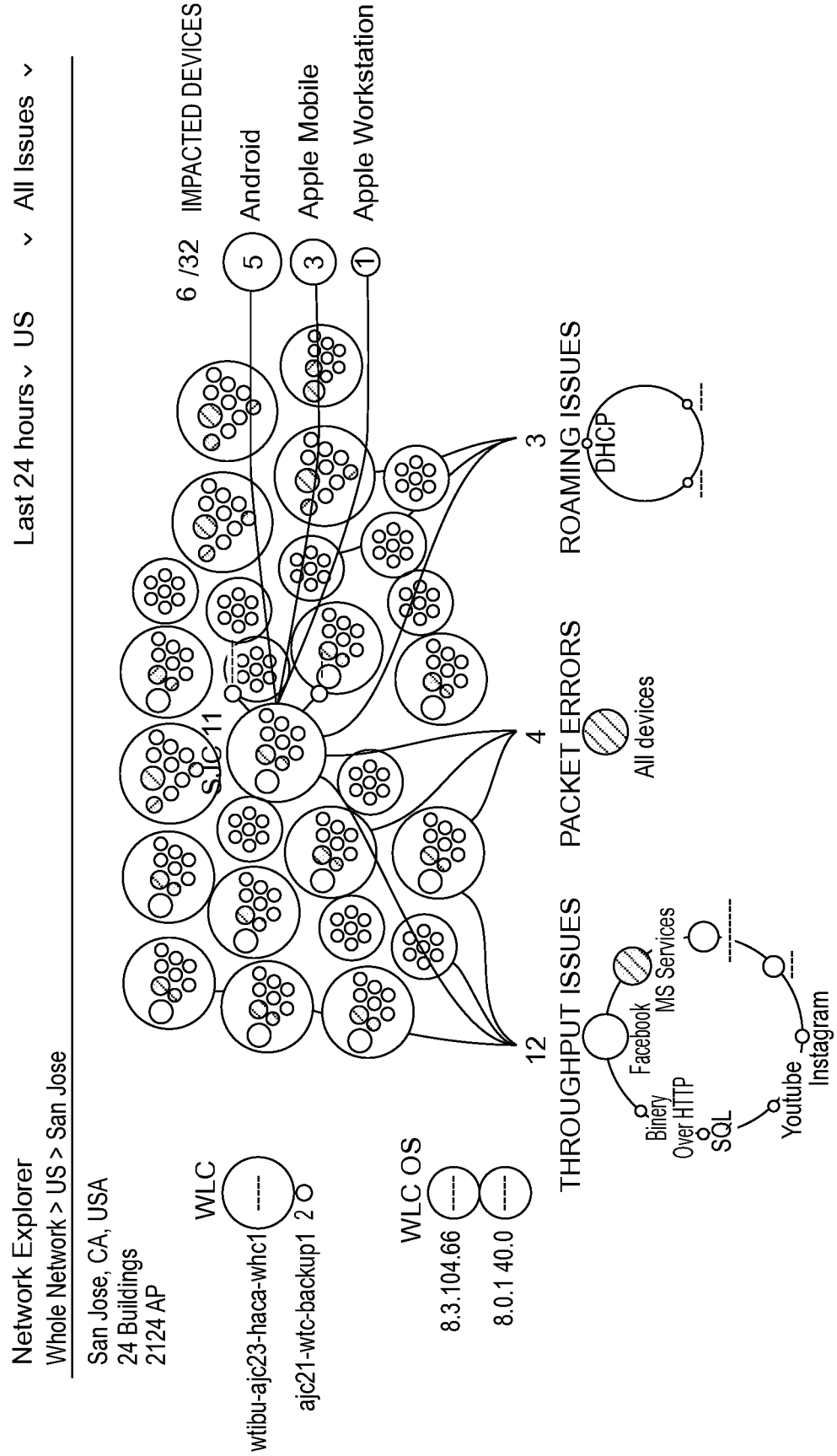
FIG. 8 illustrates an example user interface in accordance with some embodiments.
Figure 9:
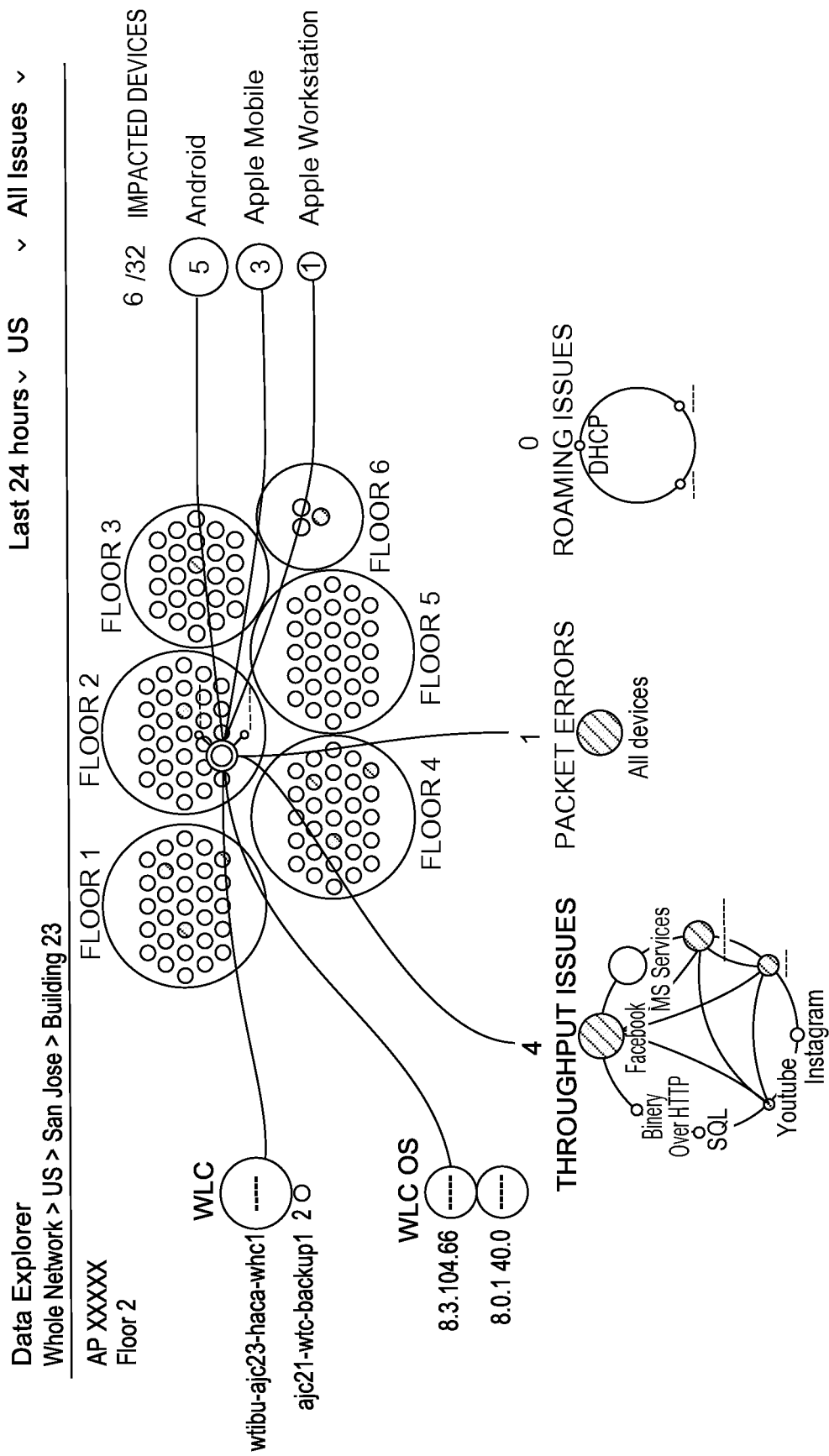
FIG. 9 illustrates an example user interface in accordance with some embodiments.

As an example, in FIGS. 5-9, the relative locations of certain sites are shown within the user interface. In some embodiments, the relative locations of certain sites are shown based on user input selecting and/or imparting an intent to view network data for the sites within the whole network. In FIG. 5, for example, the locations of network components 550, such as SJG 510, BOLK 512, FLM 524, and RIP 514 (located in the United States) and DGM 516, LM 518, and DCL 520 (located in Europe), are shown. In some embodiments, user input can be received through detection of a click on a site. For example, detecting a click on the SJG 510 site further shows FIG. 6, which shows the site of SJG 510 with the buildings in the same orientation as it is relative to each building. This gives the graphical user interface two aspects: the full network view of what devices are located where (FIG. 5); and secondly, the relative locations of the devices within certain sites (FIG. 6) or within certain floors in each site (FIG. 9). The example embodiments shown in FIGS. 5-9 are by no means the only way to do the following abstraction techniques but is only one example/instantiation of the idea of the complete geo-location based abstraction of all aspects of an operational network, together with corresponding KPIs and characteristics that are updated as the user navigates deeper into sites (or out of sites) to see the whole network. In addition, FIGS. 5-7 include a timeline (e.g., timelines 530, 630, and 730 in FIGS. 5, 6, and 7, respectively) that provides a time aspect to the abstraction techniques in order to capture changes in the network and its relationship to other entities.

2. Network Relationship Mapping.

A mapping component shows how every aspect of the network is related to each other by mapping network components to each other based on one or more network component relationships. For example, when the graphical user interface receives a selection from a user that selects the world level (e.g., FIG. 5), the graphical user interface will show all the issues/apps/entities at the world level. The world level can, for example, reflect the entire network—in FIG. 5, for example, summary component 522 shows an informational summary of the whole network; in this case the whole network includes 8 sites (e.g., network components 550 including, but not limited to, SJG 510, BOLK 512, FLM 524, RIP 514, DGM 516, LM 518, and DCL 520) with 56 buildings.

The system can receive one or more metrics associated with each network component. In some embodiments, metrics can be received from a collection data service that collects and identifies metrics associated with network components periodically, or on a real- or near real-time basis. In FIG. 5, for example, the metrics can include, but is not limited to: the number of impacted devices 526; the number of throughput issues 528 (and whether its associated with Facebook, MS services, Youtube, Instagram, etc.); the number of packet errors 532; and the number of roaming issues 534. The number of impacted devices 526 can further include a breakdown of the type of device and/or their operating systems, such as the number of impacted devices that are Apple mobiles, Windows workstations, Androids, Apple workstations, Linux, Play Stations, Amazon Echo, etc. In FIG. 5, for example, the UI shows that in the selectable time range 536 (e.g., the last 24 hours), the whole network experienced 132 impacted devices 526, 80 throughput issues 528, 22 packet errors 532, and 14 roaming issues 534.

Figure 6:
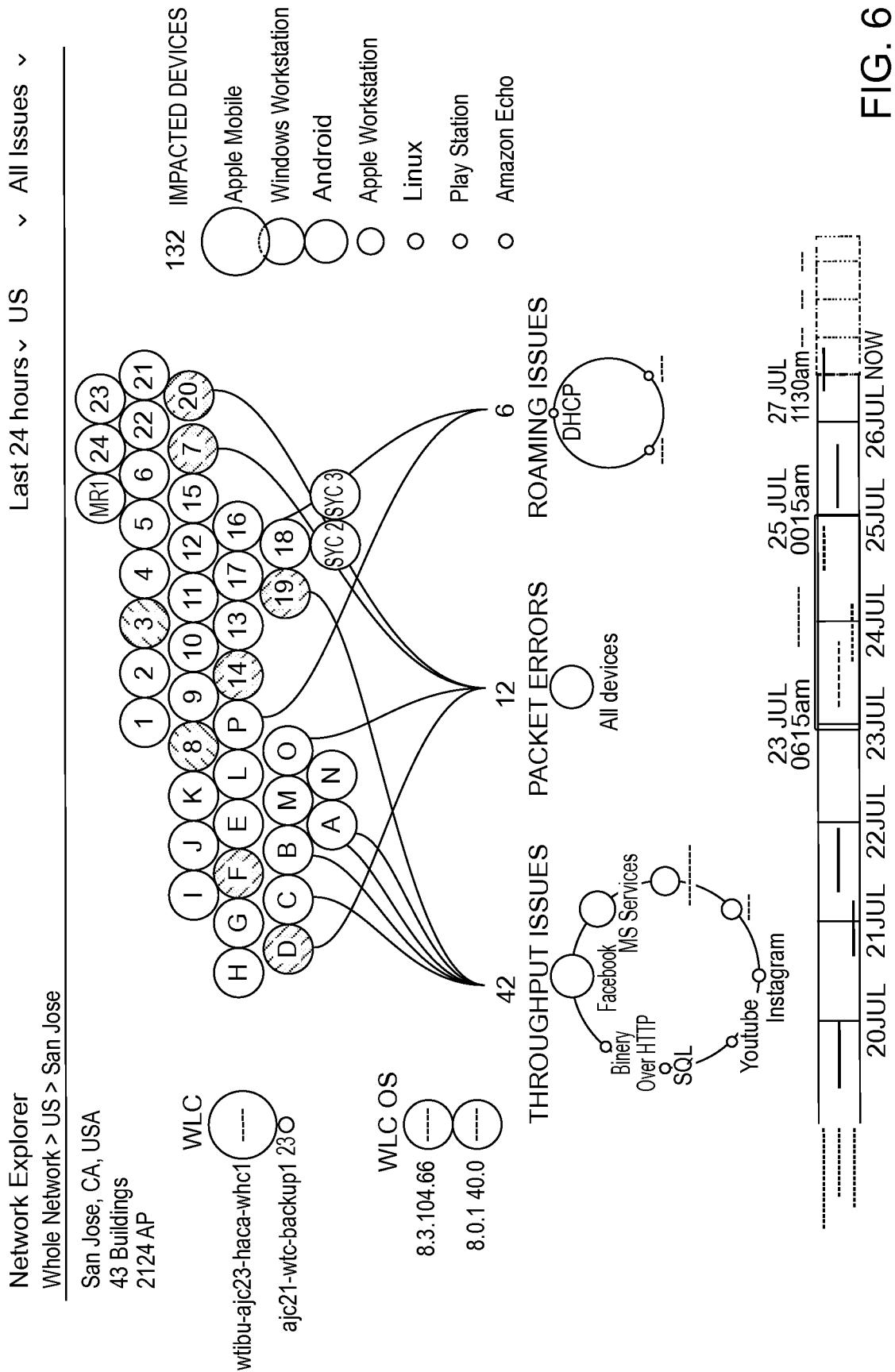
FIG. 6 illustrates an example user interface in accordance with some embodiments.

The user can easily start to drill down and narrow their overview by clicking on a particular site (see, for example, FIGS. 6, 8, and 9). As the user clicks on a particular site, the shown relationships on the graphical user interface will change accordingly to display only the relevant entities and characteristics with the right relationships. This will allow the user to interactively pick the areas of high activity and interest which are cued by the UI. The examples shown in FIGS. 5-9 show some features demonstrating this. It enables the ability to show relationships of all kinds: KPIs, relationship to other network entities, etc. and at the same time be aware of the hierarchical level the user is currently at (e.g., country/site/building/floor). Also, timeline 530 can keep track of the time aspect using a slider that allows the user to see relationships as they change with time.

3. Interactivity.

An interactivity component can ensure that every UI element on the screen is interactive. A user can interact and get additional information or drill deeper into the network using this interaction feature. Accordingly, the graphical user interface can detect and/or receive user interactions with the UI elements in order to facilitate the display of additional information, such as drilling deeper or higher within the network hierarchy. This can provide a completely intuitive experience of exploring all aspects of the network. This enables the ability of a user to click and see data, as well as providing a fully contextual component where all elements on the interface are interactive and provide all information and data associated with it, which in turn can further be interacted with if there are associated properties that can be drilled down further.

FIGS. 5-9 represent example interfaces that abstract out a network according to some embodiments while providing seamless interactivity to the user, such as the methodology of FIG. 4B. The network can be organized by geographical location, logical hierarchy of devices (e.g., a wireless network has a controller at a first layer, access points at a lower layer, and then clients connected to the access points at a lowest layer, etc.), etc. Thus, aspects relate to a purely network abstracted view of the network with relationships mapping to different components of the network.

In some embodiments, the network component relationship can be a hierarchical relationship that changes over a time period (e.g., selectable time period, such as through a drop down menu), and relationships between components of the network can be determined by using tree based mechanisms where the parent of the tree is known. For example, there can be a router that is managing a whole site, and below the router there are switches talking to the router, and below that there are access points that are connected to the switches, etc. The router is at the top of the tree, followed hierarchically down by the switches, and then followed even further hierarchically down by the access points. Other types of relationships can follow a similar format. For example, for building and client relationships, a building can have a certain number of devices (e.g., 50 iPhones, 100 Samsung phones, 15 Windows phones, laptops, desktops, etc.) and those devices are seeing applications (e.g., Facebook, media traffic such as downloading, streaming, etc.). These can similarly be represented as a tree based relationship where the building is the parent, the devices are below the building, the applications are below the devices, etc. In other words, tree-based relationship mapping can be used to, in general, find out how components within the network are related.

For example, FIG. 5 shows an example embodiment abstracting the network based on geolocation, which is shown in the UI as grouped network components 550 (SJG 510, BOLK 512, etc.). In order to go a level down the tree, a user could select one of the grouped network components to go down the tree. Once a site is selected or clicked, such as in FIG. 6, the user interface transitions into illustrating components within the site. For example, the buildings of the site SJG can be shown. When a building is selected, the user interface can show the floors of the site, etc. Selection keeps going down the tree.

For example, a building 650 can be mapped to a certain number of clients at a given time; the building can be further mapped to how many applications it's seeing; the building 650 can be mapped to a certain controller that's managing the building; and/or mapped to other types of components. FIG. 6 shows an example embodiment that shows a site level view of the network. In this example, the view is of FIG. 5's site SJG 510. The example UI in FIG. 6 includes summary component 622 that gives a broad overview of the UI, listing the site (SJG), the number of buildings at site SJG (42), etc. In some embodiments the 42 buildings 650 are shown in relation to their locations with respect to each other (although in other embodiments the buildings can be shown in relation to any type of relationship—physically and/or logically based).

Similarly to FIG. 5, the system can receive one or more metrics, such as one or more metrics associated with each building. For example, the metrics can include, but are not limited to: the number of impacted devices 626; the number of throughput issues 628 (and whether its associated with Facebook, MS services, Youtube, Instagram, etc.); the number of packet errors 632; and the number of roaming issues 634. The number of impacted devices 626 can further include a breakdown of the type of device and/or their operating systems, such as the number of impacted devices that are Apple mobiles, Windows workstations, Androids, Apple workstations, Linux, Play Stations, Amazon Echo, etc. The UI shows that in the selectable time range 636 (e.g., the last 24 hours), the site SJG experienced 132 impacted devices 626, 42 throughput issues 628, 12 packet errors 632, and 6 roaming issues 634. A slider component like timeline 630 is presented that allows a user to manipulate the time period for which the data applies.

FIG. 7 illustrates another example embodiment of a whole network level view of the network. In FIG. 7, site SJG 710 is highlighted in relation to other sites, such as to show the one or more metrics in a context of the relationships between the sites in the network. This context could be in relation to other sites, its hierarchical place within the network, its geographical location with respect to other network elements, etc. In this case, site SJG 710 is highlighted against other network component 750 sites. The one or more metrics are presented as well, such as the number of impacted devices 726; the number of throughput issues 728 (and whether its associated with Facebook, MS services, Youtube, Instagram, etc.); the number of packet errors 732; and the number of roaming issues 734. The number of impacted devices 726 can further include a breakdown of the type of device and/or their operating systems, such as the number of impacted devices that are Apple mobiles, Windows workstations, Androids, Apple workstations, Linux, Play Stations, Amazon Echo, etc. The UI shows that in the selectable time range 736 (e.g., the last 24 hours), the site SJG 710 experienced 132 impacted devices 726, 42 throughput issues 728, 12 packet errors 732, and 6 roaming issues 734. A slider component like timeline 730 is presented that allows a user to manipulate the time period for which the data applies.

FIG. 8 illustrates another example embodiment of a site level view of the network. In FIG. 8, building SJG 11 810 is highlighted in relation to the other buildings within the network. The one or more metrics for building SJG 11 810 are presented as well, such as the number of impacted devices 826; the number of throughput issues 828 (and whether its associated with Facebook, MS services, Youtube, Instagram, etc.); the number of packet errors 832; and the number of roaming issues 834. The number of impacted devices 826 can further include a breakdown of the type of device and/or their operating systems, such as the number of impacted devices that are Apple mobiles, Windows workstations, Androids, Apple workstations, Linux, Play Stations, Amazon Echo, etc. The UI shows that in the selectable time range 836 (e.g., the last 24 hours), the building SJG 11 810 experienced 6 out of the total 132 impacted devices 826, 42 throughput issues 828, 4 packet errors 832, and 3 roaming issues 834.

FIG. 9 illustrates, in this example embodiment, a number of metrics experienced by an access point 910 (that the user has clicked) on floor 2 912. This is at one of the lowest levels of the tree. This provides a visual, holistic view that represents how the issues are related to certain network components and/or what the network currently looks like. The one or more metrics for building access point 910 are presented, such as the number of impacted devices 926; the number of throughput issues 928 (and whether its associated with Facebook, MS services, Youtube, Instagram, etc.); the number of packet errors 932; and the number of roaming issues 934. The number of impacted devices 926 can further include a breakdown of the type of device and/or their operating systems, such as the number of impacted devices that are Apple mobiles, Windows workstations, Androids, Apple workstations, Linux, Play Stations, Amazon Echo, etc. The UI shows that in the selectable time range 936 (e.g., the last 24 hours), access point 910 experienced 6 out of the total 32 impacted devices 926, 4 throughput issues 928, 1 packet error 932, and 0 roaming issues 934. A slider component like timeline 930 is presented that allows a user to manipulate the time period for which the data applies.

In some embodiments, the throughput issues, packet errors, roaming issues, etc. in this example have already occurred. The system finds the relationship between the issue and a network component (e.g., this issue occurred on a certain access point and/or on a certain controller, etc.). Data is received from a system that already sees this issue (e.g., an issue identified by a network element or a controller, for example).

This system is completely interactive. Right now there are no systems that can actually interactively explore the whole network. This provides a way to go deeper down into network components (e.g., go into more and more granular detail).

Aspects of this technology enable an interactive UI interface that abstracts all the operational characteristics of a network and allows an operator to see the relationships between network entities and metrics associated with that entity. This interface provides a logical abstraction of geo-location and allows a network operator to explore the different aspects of an operational network and get a holistic view of the state of the network.

Figure 10A:
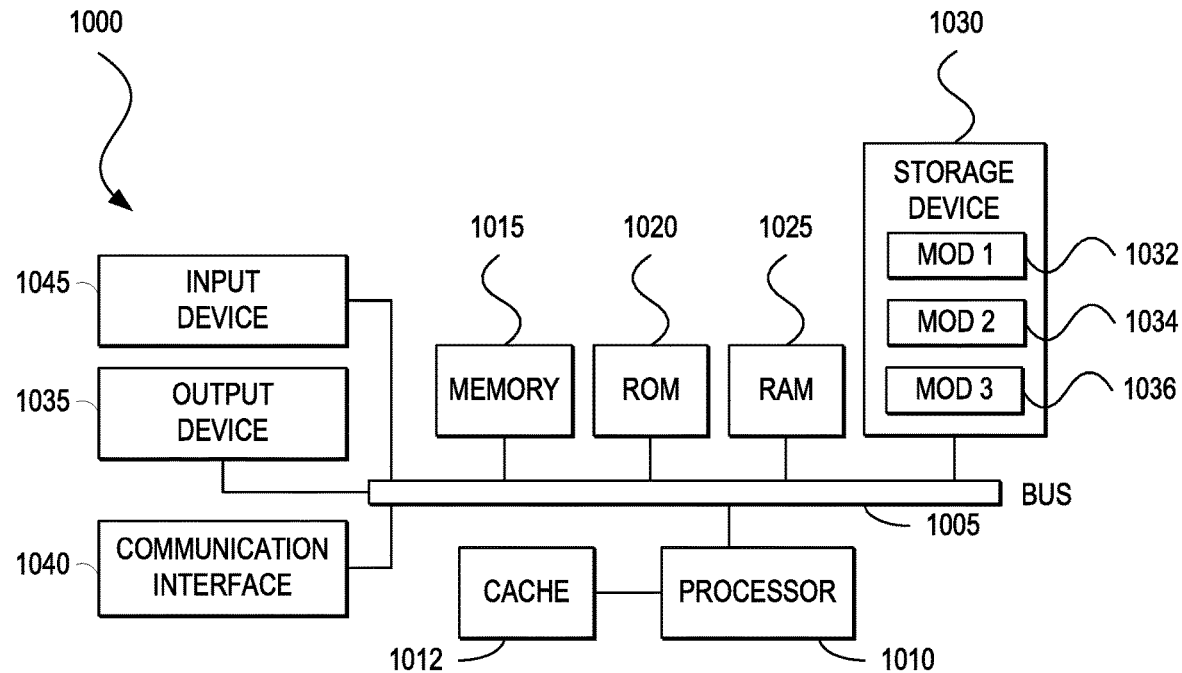
FIGS. 10A and 10B illustrate examples of systems in accordance with some embodiments.
Figure 10B:
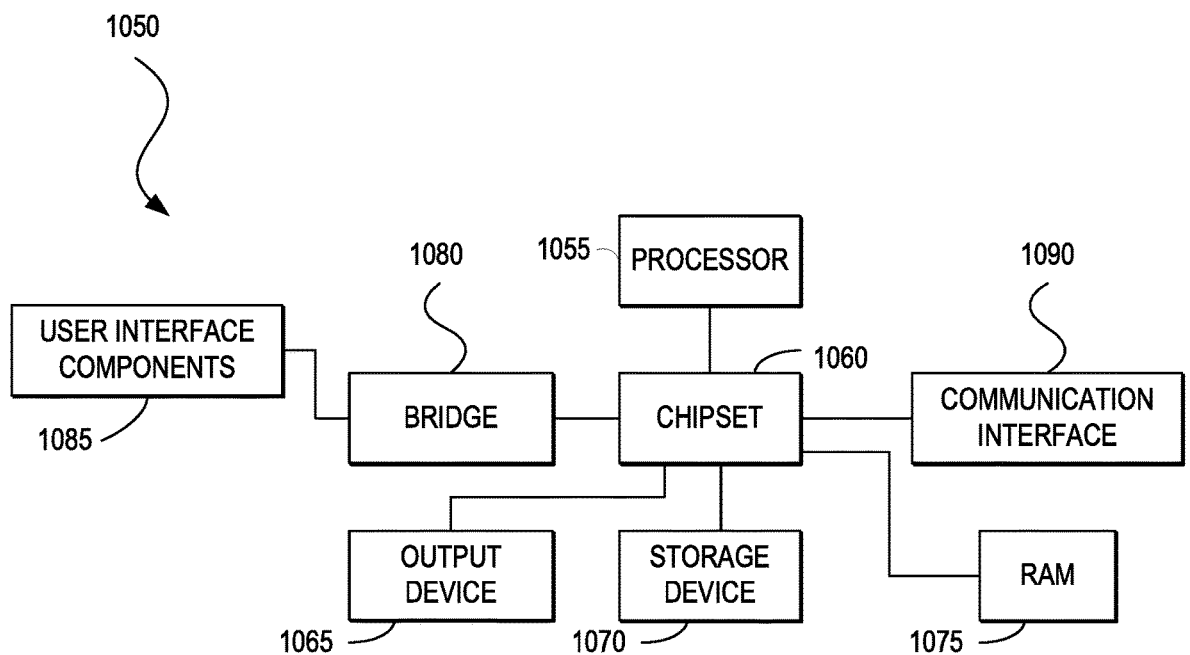

FIG. 10A and FIG. 10B illustrate systems in accordance with various embodiments. The more appropriate system will be apparent to those of ordinary skill in the art when practicing the various embodiments. Persons of ordinary skill in the art will also readily appreciate that other systems are possible.

FIG. 10A illustrates an example of a bus computing system 1000 wherein the components of the system are in electrical communication with each other using a bus 1005. The computing system 1000 can include a processing unit (CPU or processor) 1010 and a system bus 1005 that may couple various system components including the system memory 1015, such as read only memory (ROM) 1020 and random access memory (RAM) 1025, to the processor 1010. The computing system 1000 can include a cache 1012 of high-speed memory connected directly with, in close proximity to, or integrated as part of the processor 1010. The computing system 1000 can copy data from the memory 1015, ROM 1020, RAM 1025, and/or storage device 1030 to the cache 1012 for quick access by the processor 1010. In this way, the cache 1012 can provide a performance boost that avoids processor delays while waiting for data. These and other modules can control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in the storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing system 1000, an input device 1045 can represent any number of input mechanisms, such as a microphone for speech, a touch-protected screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing system 1000. The communications interface 1040 can govern and manage the user input and system output. There may be no restriction on operating on any particular hardware arrangement and therefore the basic features here may easily be substituted for improved hardware or firmware arrangements as they are developed.

The storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 1030 can include the software modules 1032, 1034, 1036 for controlling the processor 1010. Other hardware or software modules are contemplated. The storage device 1030 can be connected to the system bus 1005. In some embodiments, a hardware module that performs a particular function can include a software component stored in a computer-readable medium in connection with the necessary hardware components, such as the processor 1010, bus 1005, output device 1035, and so forth, to carry out the function.

FIG. 10B illustrates an example architecture for a chipset computing system 1050 that can be used in accordance with an embodiment. The computing system 1050 can include a processor 1055, representative of any number of physically and/or logically distinct resources capable of executing software, firmware, and hardware configured to perform identified computations. The processor 1055 can communicate with a chipset 1060 that can control input to and output from the processor 1055. In this example, the chipset 1060 can output information to an output device 1065, such as a display, and can read and write information to storage device 1070, which can include magnetic media, solid state media, and other suitable storage media. The chipset 1060 can also read data from and write data to RAM 1075. A bridge 1080 for interfacing with a variety of user interface components 1085 can be provided for interfacing with the chipset 1060. The user interface components 1085 can include a keyboard, a microphone, touch detection and processing circuitry, a pointing device, such as a mouse, and so on. Inputs to the computing system 1050 can come from any of a variety of sources, machine generated and/or human generated.

The chipset 1060 can also interface with one or more communication interfaces 1090 that can have different physical interfaces. The communication interfaces 1090 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 1055 analyzing data stored in the storage device 1070 or the RAM 1075. Further, the computing system 1050 can receive inputs from a user via the user interface components 1085 and execute appropriate functions, such as browsing functions by interpreting these inputs using the processor 1055.

It will be appreciated that computing systems 1000 and 1050 can have more than one processor 1010 and 1055, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving network component data that identifies metrics associated with network components; and
presenting a graphical user interface made up of representations of network components of a network, wherein the network components are selectable and relevant network components are displayed at varying network scales by:
  receiving an input, by the graphical user interface, selecting a first representation of a first network component at a first network level;
  based on a network component relationship between the first representation of the first network component and a second representation of a second network component, receiving second network component data that identifies one or more metrics associated with the second network component, wherein the second network component is at a second network level and the network component relationship defines one or more intent defined dependencies between the first network component and the second network component and the one or more metrics includes at least impacted devices, wherein the one or more intent defined dependencies between the first network component and the second network component are translated from an objective of a user to a network configuration; and presenting the one or more metrics associated with the second network component within a context of the second network level, wherein a time period over which the network component relationship is determined is selectable, and wherein as the time period is changed, the network components and the one or more metrics associated with the second network component changes accordingly.

2. The method of claim 1, the method further comprising:
receiving an input, by the graphical user interface, selecting a first time period; and
based on the selected first time period, automatically modifying the presented one or more metrics based on the network component relationship varying from a second time period, wherein the network component relationship is a hierarchical relationship between different levels of the network.

3. The method of claim 1, wherein the second network component comprises one or more of a network device, building, or location.

4. The method of claim 1, wherein each successive selection of each network component presents another network component at successively more granular hierarchical levels.

5. The method of claim 1, wherein all network components are presented within a context of their relationships, and wherein all network components are selectable.

6. The method of claim 1, wherein the context the network component relationship is in relation to other sites, a hierarchical place of the first network component within the network, and a geographical location of the first network component with respect to other network components.

7. The method of claim 1, wherein the one or more intent defined dependencies between the first network component and the second network component are defined by locations of the first network component and the second network component.

8. The method of claim 1, wherein the one or more intent defined dependencies between the first network component and the second network component are automated by an intent-based network.

9. A system comprising:
a server configured to map network components within a network, the server to:
receive network component data that identifies metrics associated with network components; and
present a graphical user interface made up of representations of network components of a network, wherein the network components are selectable and relevant network components are displayed at varying network scales by:
receiving an input, by the graphical user interface, selecting a first representation of a first network component at a first network level;
based on a network component relationship between the first representation of the first network component and a second representation of a second network component, receiving second network component data that identifies one or more metrics associated with the second network component, wherein the second network component is at a second network level and the network component relationship defines one or more intent defined dependencies between the first network component and the second network component and the one or more metrics includes at least impacted devices, wherein the one or more intent defined dependencies between the first network component and the second network component are translated from an objective of a user to a network configuration; and
presenting the one or more metrics associated with the second network component within a context of the second network level,
wherein a time period over which the network component relationship is determined is selectable, and wherein as the time period is changed, the network components and the one or more metrics associated with the second network component changes accordingly.

10. The system of claim 9, wherein all network components are presented within a context of their relationships, and wherein all network components are selectable.

11. The system of claim 9, the server further configured to:
receive an input, by the graphical user interface, selecting a first time period; and
based on the selected first time period, automatically modify the presented one or more metrics based on the network component relationship varying from a second time period, wherein the network component relationship is a hierarchical relationship between different levels of the network.

12. The system of claim 9, wherein the second network component comprises one or more of a network device, building, or location.

13. The system of claim 9, wherein each successive selection of each network component presents another network component at successively more granular hierarchical levels.

14. The system of claim 9, wherein the context the network component relationship is in relation to other sites, a hierarchical place of the first network component within the network, and a geographical location of the first network component with respect to other network components.

15. The system of claim 9, wherein the one or more intent defined dependencies between the first network component and the second network component are defined by locations of the first network component and the second network component.

16. A non-transitory computer-readable medium containing instructions that, when executed by a computing system, cause the computing system to:
receive network component data that identifies metrics associated with network components; and
present a graphical user interface made up of representations of network components of a network, wherein the network components are selectable and relevant network components are displayed at varying network scales by:
receiving an input, by the graphical user interface, selecting a first representation of a first network component at a first network level;
based on a network component relationship between the first representation of the first network component and a second representation of a second network component, receiving second network component data that identifies one or more metrics associated with the second network component, wherein the second network component is at a second network level and the network component relationship defines one or more intent defined dependencies between the first network component and the second network component and the one or more metrics includes at least impacted devices, wherein the one or more intent defined dependencies between the first network component and the second network component are translated from an objective of a user to a network configuration; and presenting the one or more metrics associated with the second network component within a context of the second network level, wherein a time period over which the network component relationship is determined is selectable, and wherein as the time period is changed, the network components and the one or more metrics associated with the second network component changes accordingly.

17. The non-transitory computer-readable medium of claim 16, further causing the computing system to:

receive an input, by the graphical user interface, selecting a first time period; and based on the selected first time period, automatically modify the presented one or more metrics based on the network component relationship varying from a second time period, wherein the network component relationship is a hierarchical relationship between different levels of the network.

18. The non-transitory computer-readable medium of claim 16, wherein the second network component comprises one or more of a network device, building, or location.

19. The non-transitory computer-readable medium of claim 16, wherein each successive selection of each network component presents another network component at successively more granular hierarchical levels.

20. The non-transitory computer-readable medium of claim 16, wherein the context the network component relationship is in relation to other sites, a hierarchical place of the first network component within the network, and a geographical location of the first network component with respect to other network components.

* * * * *